US011838545B2

(12) United States Patent
Kim et al.

(10) Patent No.: US 11,838,545 B2
(45) Date of Patent: *Dec. 5, 2023

(54) PREDICTION METHOD USING CURRENT PICTURE REFERENCING MODE, AND VIDEO DECODING DEVICE THEREFOR

(71) Applicant: SK TELECOM CO., LTD., Seoul (KR)

(72) Inventors: Jae Il Kim, Seoul (KR); Sun Young Lee, Seoul (KR); Se Hoon Son, Seoul (KR); Jae Seob Shin, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,783

(22) Filed: Jun. 23, 2022

(65) Prior Publication Data

US 2022/0329856 A1 Oct. 13, 2022

Related U.S. Application Data

(63) Continuation of application No. 17/225,397, filed on Apr. 8, 2021, now Pat. No. 11,405,639, and a (Continued)

(30) Foreign Application Priority Data

Oct. 8, 2018 (KR) .................. 10-2018-0119881
Jun. 10, 2019 (KR) .................. 10-2019-0067724

(51) Int. Cl.
*H04N 19/593* (2014.01)
*H04N 19/105* (2014.01)
*H04N 19/11* (2014.01)
*H04N 19/174* (2014.01)
*H04N 19/176* (2014.01)
*H04N 19/70* (2014.01)

(52) U.S. Cl.
CPC ......... *H04N 19/593* (2014.11); *H04N 19/105* (2014.11); *H04N 19/11* (2014.11); (Continued)

(58) Field of Classification Search
None
See application file for complete search history.

(56) References Cited

U.S. PATENT DOCUMENTS

2015/0271515 A1\* 9/2015 Pang .................. H04N 19/70
375/240.16
2015/0373358 A1 12/2015 Pang et al.
(Continued)

FOREIGN PATENT DOCUMENTS

CN 105493505 A 4/2016
CN 107660341 A 2/2018
(Continued)

OTHER PUBLICATIONS

Xu, Xiaozhong et al., "Intra block copy improvement on top of Tencent's CfP response", Joint Video Experts Team (JVET) of ITU-T SG 16 WP 3 and ISO/IEC JTC 1/SC 29/WG 11, 10 th Meeting; San Diego, US, Apr. 10-20, 2018, 4 Pages, cited in NPL3.
(Continued)

*Primary Examiner* — Chikaodili E Anyikire
(74) *Attorney, Agent, or Firm* — Hauptman Ham, LLP

(57) ABSTRACT

Disclosed are a method for predicting a current block using a current picture referencing mode (also called intra block copy (ibc) mode), and a video encoding or decoding device therefor. The method comprises: decoding, from a bitstream, an enable flag indicating whether the application of the ibc mode is allowed, and type information indicating whether the type of slices is an inter type; depending on the enable flag and the type information, decoding from the bitstream an ibc flag indicating whether a prediction mode for the (Continued)

current block is the ibc mode; when the ibc flag indicates the ibc mode, decoding motion information from the bitstream; and predicting the current block by using a block indicated by the motion information within a current picture in which the current block is located.

9 Claims, 17 Drawing Sheets

Related U.S. Application Data continuation of application No. PCT/KR2019/013129, filed on Oct. 7, 2019.

(52) U.S. Cl.
CPC ......... *H04N 19/174* (2014.11); *H04N 19/176* (2014.11); *H04N 19/70* (2014.11)

(56) References Cited

U.S. PATENT DOCUMENTS

| | | |
|---|---|---|
| 2016/0353117 A1 | 12/2016 | Seregin et al. |
| 2016/0360210 A1 | 12/2016 | Xiu et al. |
| 2017/0099495 A1* | 4/2017 | Rapaka ................ H04N 19/523 |
| 2017/0142418 A1 | 5/2017 | Li et al. |
| 2017/0280159 A1 | 9/2017 | Xu et al. |
| 2017/0302935 A1 | 10/2017 | Li et al. |

FOREIGN PATENT DOCUMENTS

| | | |
|---|---|---|
| IN | 107079161 A | 8/2017 |
| KR | 10-2018-0013918 A | 2/2018 |
| KR | 10-2018-0063094 A | 6/2018 |
| WO | 2015-194913 A1 | 12/2015 |

OTHER PUBLICATIONS

Ma, Jonghyun et al., "Intra Block Copy Analysis to Improve Coding Efficiency for HEVC Screen Content Coding", Journal of Broadcast Engineering, vol. 20 Issue 1, 2015, pp. 57-67, cited in NPL3.

International Search Report dated Jan. 20, 2020, corresponding to International Application No. PCT/KR2019/013129 citing the above reference(s).

Chinese Office Action dated Jul. 1, 2023 for corresponding Chinese Patent Application No. 201980081334.7, 15 pages.

\* cited by examiner

| Tile group type | CU type | CU mode | mode | ref_idx | cbf | Total bits | ibc=off |
|---|---|---|---|---|---|---|---|
| P or B | inter | skip | 1 | – | 0 | 2 | 1 0 |
| | | merge | 1 | – | 1 | 2 | 1 1 |
| | | AMVP | 010 | 0 | 0/1 | 5 | 01 0 0/1 |
| | intra | mode | 00 | – | – | 2 | 00 |
| | | ibc_skip | 1 | – | 0 | 2 | – |
| | | ibc_merge | 1 | – | 1 | 2 | – |
| | | ibc_BVP | 011 | – | 0/1 | 4 | – |
| I | intra | mode | 00 | – | – | 2 | – |
| | | ibc_skip | 1 | – | 0 | 2 | – |
| | | ibc_merge | 1 | – | 1 | 2 | – |
| | | ibc_BVP | 01 | – | 0/1 | 3 | – |

*FIG. 10*

| Tile group type | CU type | CU mode | mode | ref_idx | cbf | Total bits | ibc=off |
|---|---|---|---|---|---|---|---|
| P or B | inter | skip | 1 | - | 0 | 2 | 1 0 |
| | | merge | 1 | - | 1 | 2 | 1 1 |
| | | AMVP | 01 | 0 | 0/1 | 4 | 01 0 0/1 |
| | intra | mode | 000 | - | - | 3 | 00 |
| | | ibc_skip | 1 | - | 0 | 2 | - |
| | | ibc_merge | 1 | - | 1 | 2 | - |
| | | ibc_BVP | 001 | - | 0/1 | 4 | - |
| I | intra | mode | 00 | - | - | 2 | - |
| | | ibc_skip | 1 | - | 0 | 2 | - |
| | | ibc_merge | 1 | - | 1 | 2 | - |
| | | ibc_BVP | 01 | - | 0/1 | 3 | - |

*FIG. 12*

| Tile group type | CU type | CU mode | mode | ref_idx | cbf | Total bits | ibc=off |
|---|---|---|---|---|---|---|---|
| P or B | inter | skip | 1 | - | 0 | 2 | 1 0 |
| | | merge | 1 | - | 1 | 2 | 1 1 |
| | | AMVP | 001 | 0 | 0/1 | 5 | 01 0 0/1 |
| | intra | mode | 000 | - | - | 3 | 00 |
| | | ibc_skip | 1 | - | 0 | 2 | - |
| | | ibc_merge | 1 | - | 1 | 2 | - |
| | | ibc_BVP | 01 | - | 0/1 | 3 | - |
| I | intra | mode | 00 | - | - | 2 | - |
| | | ibc_skip | 1 | - | 0 | 2 | - |
| | | ibc_merge | 1 | - | 1 | 2 | - |
| | | ibc_BVP | 01 | - | 0/1 | 3 | - |

*FIG. 14*

PREDICTION METHOD USING CURRENT PICTURE REFERENCING MODE, AND VIDEO DECODING DEVICE THEREFOR

CROSS-REFERENCE TO RELATED APPLICATION

This present application is a continuation of U.S. patent application Ser. No. 17/225,397, filed on Apr. 8, 2021, which is a continuation of PCT application number PCT/KR2019/013129, filed Oct. 7, 2019, which is based on and claims priority to Patent Application No. 10-2018-0119881 filed in Korea on Oct. 8, 2018 and Patent Application No. 10-2019-0067724 filed in Korea on Jun. 10, 2019. The disclosures of above-listed applications are hereby incorporated by reference herein in their entirety.

TECHNICAL FIELD

The present invention relates to encoding and decoding of an image, and more particularly, to a prediction method with improved encoding and decoding efficiency, and a video encoding or decoding device using the same.

BACKGROUND

Since the volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the video size, resolution, and frame rate are gradually increasing, and accordingly the amount of data to be encoded is also increasing. Accordingly, a new compression technique having better encoding efficiency and higher image quality than the existing compression technique is required.

SUMMARY

Technical Problem

In order to meet these needs, the present disclosure aims to provide an improved video encoding and decoding technology. In particular, one aspect of the present disclosure relates to a technique for improving the efficiency of encoding and decoding through various methods of determining the prediction mode of the current block.

Technical Solution

According to one aspect, the present disclosure provides a method of predicting a current block to be decoded in an intra block copy (ibc) mode. The method comprises decoding, from a bitstream, an enable flag indicating whether application of the ibc mode is allowed, and type information indicating whether a slice type is inter; decoding, from the bitstream, an ibc flag indicating whether a prediction mode of the current block is the ibc mode, the decoding of the ibc flag being depending on the enable flag and the type information; when the ibc flag indicates the ibc mode, decoding, from the bitstream, motion information excluding a reference picture index of the current block; and predicting the current block using a block indicated by the motion information within a current picture, the current block being positioned in the current picture.

According to another aspect, the present disclosure provides a video decoding device comprising: a decoder configured to decode, from a bitstream, an enable flag indicating whether application of a intra block copy (ibc) mode is allowed, and type information indicating whether a slice type is inter, to decode an ibc flag indicating whether a prediction mode of the current block is the ibc mode depending on the enable flag and the type information, and to decode, when the ibc flag indicates the ibc mode, motion information excluding a reference picture index of the current block; and a predictor configured to predict the current block using a block indicated by the motion information within a current picture, the current block being positioned in the current picture.

Advantageous Effects

As is apparent from the foregoing, according to an embodiment of the present disclosure, bit efficiency may be improved because the number of bits allocated to determine the prediction mode is adaptively adjusted to the frequency of the prediction mode.

DESCRIPTION OF DRAWINGS

FIGS. 9 to 14 are diagrams illustrating various methods proposed in the present disclosure.

DETAILED DESCRIPTION

Figure 1:
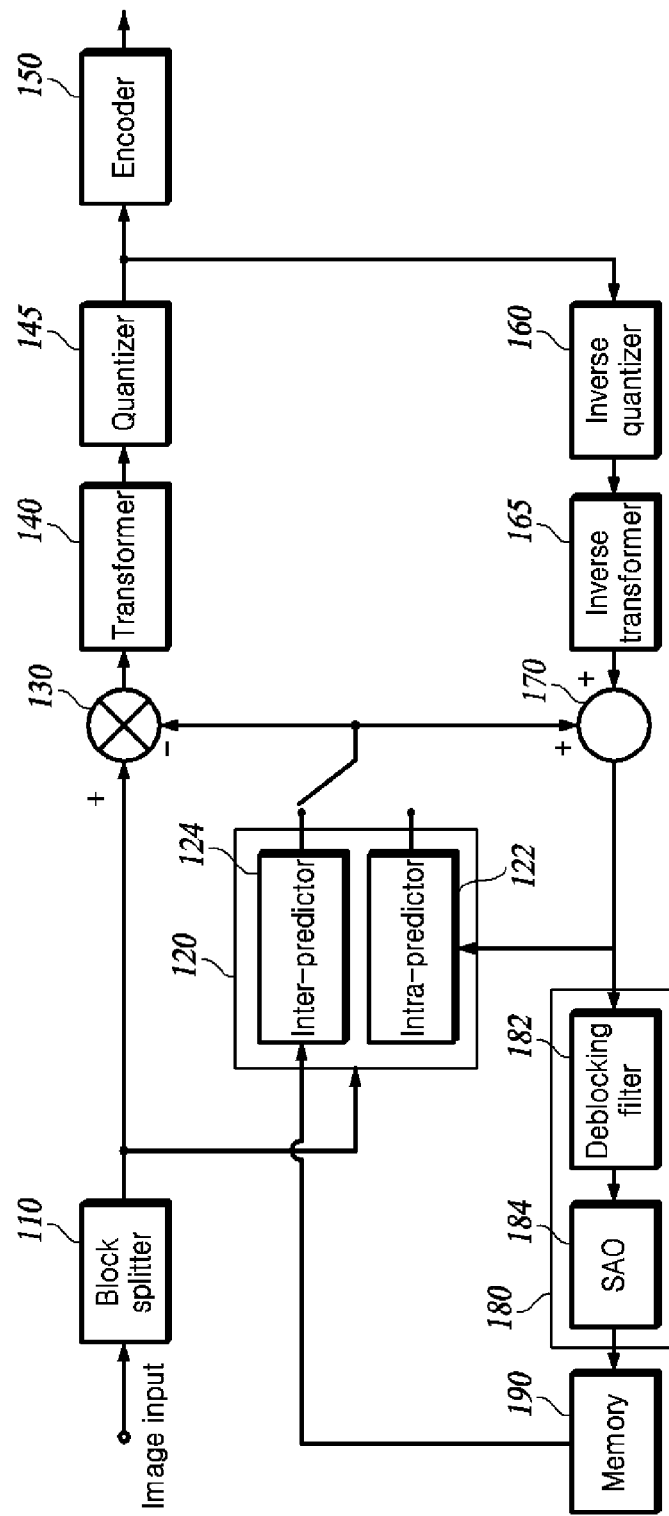
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented in software, and a microprocessor may be implemented to execute the software functions corresponding to the respective elements.

One video is composed of a plurality of pictures. Each picture is split into a plurality of regions, and encoding is performed on each region. For example, one picture is split into one or more tiles and/or slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one tile in common is encoded as a syntax of the tile or encoded as a syntax of a tile group, which is a collection of multiple tiles, and information applied to all blocks constituting one picture is encoded in a picture parameter set (PPS) or a picture header. Further, information referred to by a plurality of pictures in common is encoded in a sequence parameter set (SPS). In addition, information referred to by one or more SPSs in common is encoded in a video parameter set (VPS).

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting a video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) having the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QTBT (QuadTree plus BinaryTree) structure or a QTBTTT (QuadTree plus BinaryTree TernaryTree) structure may be used. Here, BTTTs may be collectively referred to as a multiple-type tree (MTT).

Figure 2:
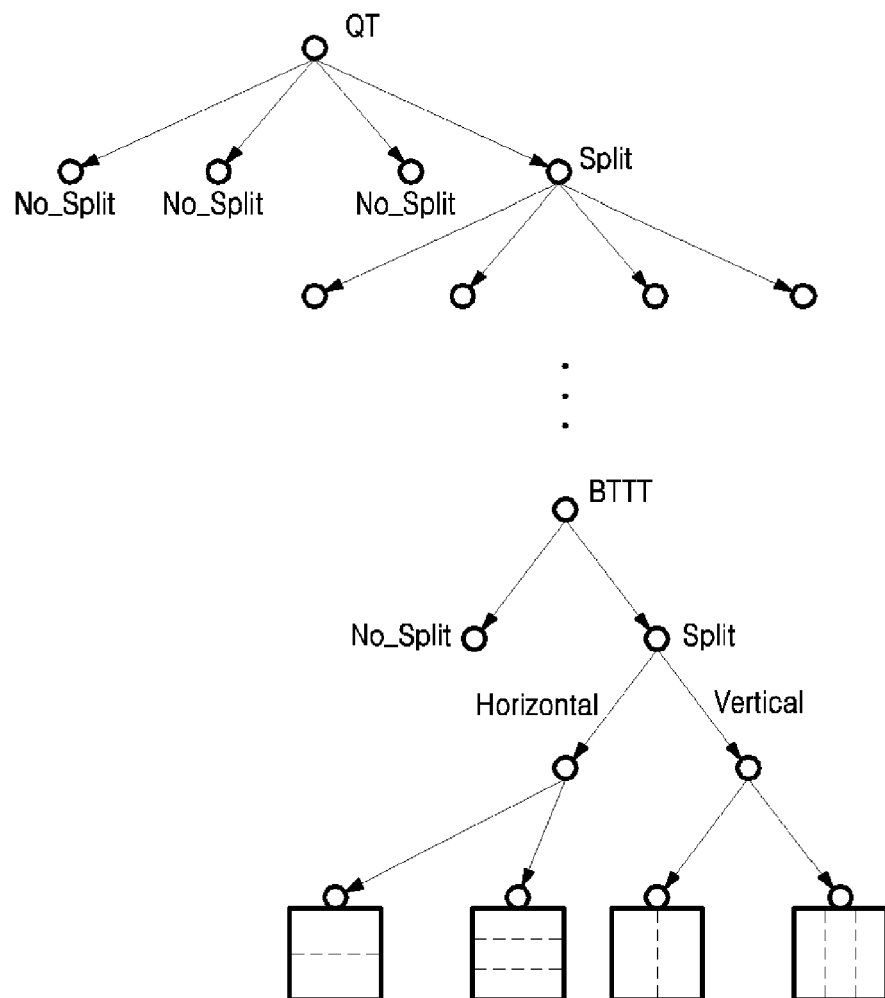
FIG. 2 exemplarily shows block partitioning structure using a QTBTTT structure.

FIG. 2 shows a QTBTTT splitting tree structure. As shown in FIG. 2, a CTU may be initially split in the QT structure. The QT splitting may be repeated until the size of the splitting block reaches the minimum block size (MinQTSize) of a leaf node allowed in the QT. A first flag (QT_split_flag) indicating whether each node of the QT structure is split into four nodes of a lower layer is encoded and signaled to the video decoding apparatus by the encoder 150. When the leaf node of the QT is not larger than the maximum block size (MaxBTSize) of the root node allowed in BT, it may be further split in one or more of the BT structure or the TT structure. In the BT structure and/or the TT structure, there may be a plurality of splitting directions. For example, there may be two directions, which are horizontal splitting and vertical splitting of the block of the node. As shown in FIG. 2, when MTT splitting starts, a second flag (mtt_split_flag) indicating whether nodes are split, and a flag indicating a splitting direction (vertical or horizontal), and/or a flag indicating a splitting type (Binary or Ternary) are encoded and signaled to the video decoding apparatus by the encoder 150.

As another example of the tree structure, when a block is split using the QTBTTT structure, information about a CU split flag (split_cu_flag) indicating that the block has been split and a QT split flag (split_qt_flag) indicating whether the splitting type is QT splitting is encoded and signaled to the video decoding apparatus by the encoder 150. When the value of split_cu_flag indicates that the block has not been split, the block of the node becomes a leaf node in the splitting tree structure and is used as a coding unit (CU), which is a basic unit of encoding. When the value of split_cu_flag indicates that the block has not been split, whether the splitting type is QT or MTT is distinguished by the value of split_qt_flag. When the splitting type is QT, there is no additional information. When the splitting type is MTT, a flag (mtt_split_cu_vertical_flag) indicating the MTT splitting direction (vertical or horizontal) and/or a flag (mtt_split_cu_binary_flag) indicating the MTT splitting type (Binary or Ternary) are encoded and signaled to the video decoding apparatus by the encoder 150.

As another example of the tree structure, when QTBT is used, there may be two splitting types, which are horizontal splitting (i.e., symmetric horizontal splitting) and vertical splitting (i.e., symmetric vertical splitting) of a block of a node into two blocks of the same size. A split flag (split_flag) indicating whether each node of the BT structure is split into blocks of a lower layer and split type information indicating the splitting type are encoded and transmitted to the video decoding apparatus by the encoder 150. There may be an additional type, which is splitting a block of a node into two asymmetric blocks. The asymmetric splitting type may include a type of splitting a block into two rectangular blocks at a size ratio of 1:3, and a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block."

The predictor 120 predicts a current block to generate a predicted block. The predictor 120 includes an intra-predictor 122 and an inter-predictor 124.

In general, each of the current blocks in a picture may be predictively coded. Prediction of a current block may be performed using the technique of intra-prediction (which is performed based on the data from a picture containing the current block) or the technique of inter-prediction (which is performed based on the data from a picture coded before the picture containing the current block). Inter-prediction includes both uni-directional prediction and bi-directional prediction.

Figure 3:
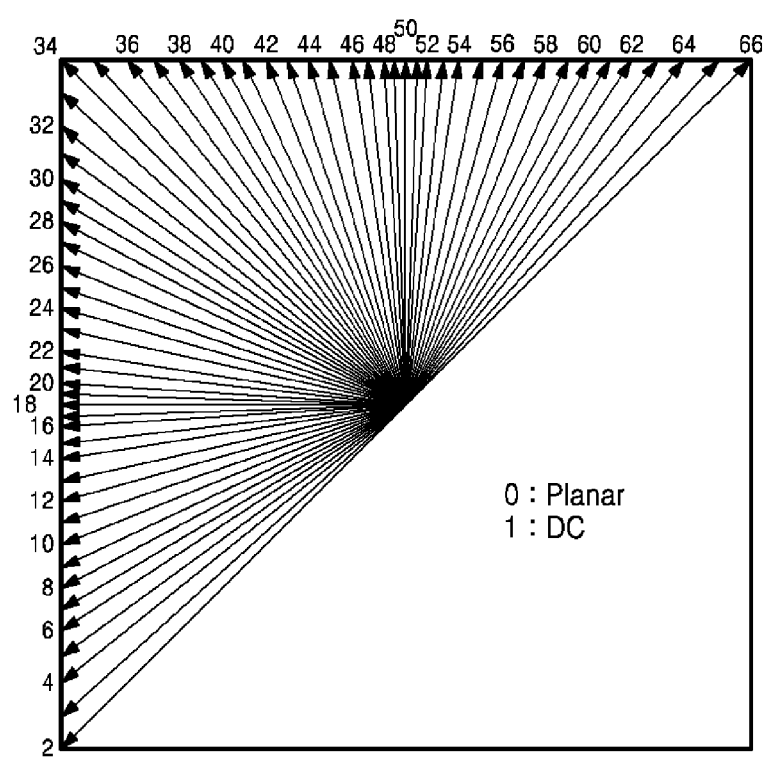
FIG. 3 exemplarily shows a plurality of intra-prediction modes.

The intra-predictor 122 predicts pixels in the current block using pixels (reference pixels) located around the current block in the current picture including the current block. There is a plurality of intra-prediction modes according to the prediction directions. For example, as shown in FIG. 3, the plurality of intra-prediction modes may include non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixel) and an equation determined according to the selected intra-prediction mode. Information about the selected intra-prediction mode is encoded by the encoder 150 and transmitted to the video decoding apparatus.

The inter-predictor 124 generates a predicted block for the current block through a motion compensation process. The inter-predictor searches for a block most similar to the current block in a reference picture encoded and decoded earlier than the current picture, and generates a predicted block for the current block based on the searched block. Then, the inter-predictor generates a motion vector corresponding to a displacement between the current block in the current picture and the predicted block in the reference picture. In general, motion estimation is performed on a luma component, and a motion vector calculated based on the luma component is used for both the luma component and the chroma component. Motion information including information on the reference picture used to predict the current block and information on the motion vector is encoded and transmitted to the video decoding apparatus by the encoder 150.

The subtractor 130 generates a residual block by subtracting the predicted block generated by the intra-predictor 122 or the inter-predictor 124 from the current block.

The transformer 140 transforms a residual signal in a residual block having pixel values in the spatial domain into a transform coefficient in the frequency domain. The transformer 140 may transform the residual signals in the residual block using the total size of the current block as a transformation unit. Alternatively, the transformer may split the residual block into sub-blocks of a transform region and non-transform region, and transform the residual signals using only the sub-block of the transform region as a transformation unit. Here, the transform region sub-block may be one of two rectangular blocks having a size ratio of 1:1 based on the horizontal axis (or vertical axis). In this case, a flag (cu_sbt_flag) indicating that only the subblock has been transformed, directional (vertical/horizontal) information (cu_sbt_horizontal_flag), and/or location information (cu_sbt_pos_flag) are encoded and signaled to the video decoding apparatus by the encoder 150. In addition, the size of the transform region sub-block may have a size ratio of 1:3 based on the horizontal axis (or vertical axis). In this case, a flag (cu_sbt_quad_flag) for distinguishing the splitting is additionally encoded signaled to the video decoding apparatus by the encoder 150.

The quantizer 145 quantizes transform coefficients output from the transformer 140, and outputs the quantized transform coefficients to the encoder 150.

The encoder 150 generates a bitstream by encoding the quantized transform coefficients using an encoding method such as Context-based Adaptive Binary Arithmetic Code (CABAC). The encoder 150 encodes information such as the CTU size, CU split flag, QT split flag, MTT splitting direction, and MTT splitting type related to block splitting, such that the video decoding apparatus splits the block in the same manner as the video encoding apparatus.

Further, the encoder 150 encodes information about a prediction type indicating whether the current block is encoded by intra-prediction or by inter-prediction, and encodes intra-prediction information (i.e., information about an intra-prediction mode) or inter-prediction information (information about a reference picture and a motion vector) according to the prediction type.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the predicted block generated by the predictor 120 to reconstruct the current block. The pixels in the reconstructed current block are used as reference pixels for intra-prediction of the next block.

The filter unit 180 filters the reconstructed pixels to reduce blocking artifacts, ringing artifacts, and blurring artifacts generated due to block-based prediction and transformation/quantization. The filter unit 180 may include a deblocking filter 182 and a sample adaptive offset (SAO) filter 184.

The deblocking filter 180 filters the boundary between the reconstructed blocks to remove blocking artifacts caused by block-by-block encoding/decoding, and the SAO filter 184 additionally filters the deblocking filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture is used as a reference picture for inter-prediction of blocks in the next picture to be encoded.

Figure 4:
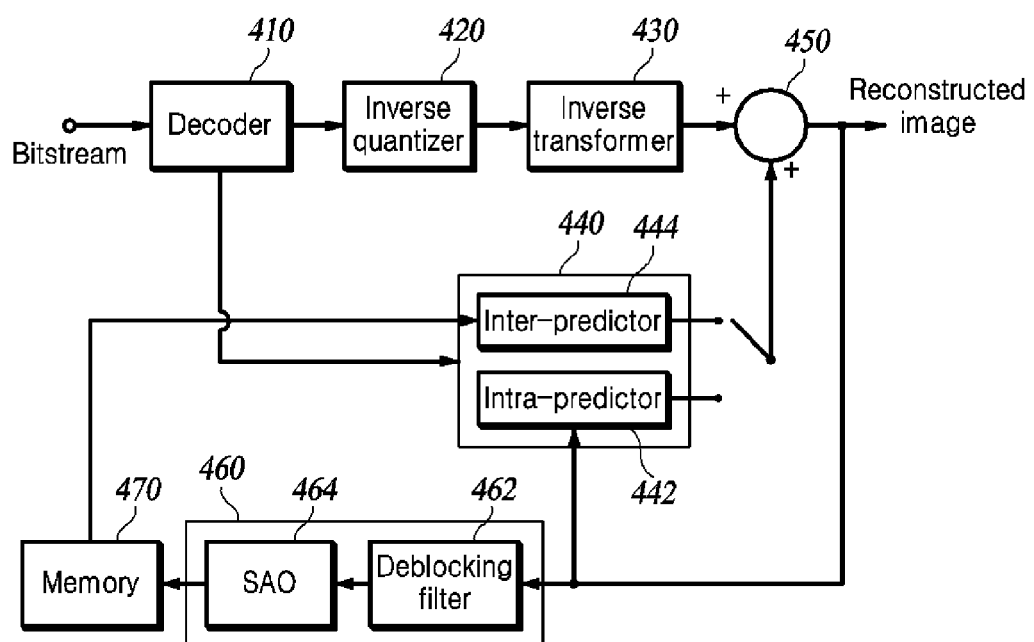
FIG. 4 is an exemplary block diagram of a video decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include a decoder 410, an inverse quantizer 420, an inverse transformer 430, a predictor 440, an adder 450, a filter unit 460, and a memory 470.

Similar to the video encoding apparatus of FIG. 1, each element of the video decoding apparatus may be implemented as hardware or software, or may be implemented as a combination of hardware and software. In addition, the function of each element may be implemented as software, and a microprocessor may be implemented to execute the functions of software corresponding to each element.

The decoder 410 determines a current block to be decoded by decoding the bitstream received from the video encoding apparatus and extracting information related to block splitting, and extracts prediction information and information on residual signals necessary to reconstruct the current block.

The decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using the QTBTTT structure, a first flag (QT_split_flag) related to QT splitting is first extracted and each node is split into four nodes of a lower layer. Then, for a node corresponding to the leaf node of QT, a second flag (MTT_split_flag) related to MTT splitting and information on the splitting direction (vertical/horizontal) and/or splitting type (binary/ternary) are extracted, and the leaf node is split in the MTT structure. In this way, each node below the leaf node of the QT is recursively split in a BT or TT structure.

As another example, when a CTU is split using the QTBTTT structure, a CU split flag (split_cu_flag) indicating whether a CU is split is first extracted. If the corresponding block is split, a QT split flag (split_qt_flag) is extracted. When the splitting type is not QT but MTT, a flag (mtt_split_cu_vertical_flag) indicating the MTT splitting direction (vertical or horizontal) and/or a flag (mtt_split_cu_binary_flag) indicating the MTT splitting type (Binary or Ternary) is additionally extracted. In the splitting process, each node may be subjected to recursive QT splitting zero or more times, and then subjected to recursive MTT splitting zero or more times. For example, the CTU may be MTT-split immediately, or may only be QT-split multiple times.

As another example, when the CTU is split using the QTBT structure, the first flag (QT_split_flag) related to the QT spitting, and each node is split into four nodes of a lower layer. For a node corresponding to the leaf node of the QT, the split_flag indicating whether the node is further BT-split and splitting direction information are extracted.

Upon determining the current block to be decoded through tree structure splitting, the decoder 410 extracts information about a prediction type indicating whether the current block is subjected to intra-prediction or inter-prediction. When the prediction type information indicates intra-prediction, the decoder 410 extracts a syntax element for the intra-prediction information (intra-prediction mode) for the current block. When the prediction type information indicates inter-prediction, the decoder 410 extracts a syntax element for the inter-prediction information, that is, information indicating a motion vector and a reference picture referred to by the motion vector.

The decoder 410 extracts information about quantized transform coefficients of the current block as information about residual signals.

The inverse quantizer 420 inversely quantizes the quantized transform coefficients, and inversely transforms the inversely quantized transform coefficients from the frequency domain to the spatial domain to reconstruct residual signals to generate a residual block for the current block.

In addition, when the inverse transformer 430 inversely transforms only a partial region (sub-block) of a transform block, a flag (cu_sbt_flag) indicating that only a sub-block of the transform block has been transformed, and the direction information (vertical/horizontal) about the sub-block (cu_sbt_horizontal_flag) and/or sub-block location information (cu_sbt_pos_flag) are extracted. Then, residual signals are reconstructed by inversely transforming the transform coefficients of the sub-block from the frequency domain to the spatial domain. For the region that is not inversely transformed, the residual signal is filled with "0". Thereby, the final residual block for the current block is created.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on a syntax element for the intra-prediction mode extracted from the decoder 410, and predicts the current block based on the reference pixels around the current block according to the intra-prediction mode.

The inter-predictor 444 determines a motion vector of the current block and a reference picture referenced by the motion vector based on the syntax element for the intra-prediction mode extracted from the decoder 410, and predicts the current block based on the motion vector and the reference picture.

The adder 450 reconstructs the current block by adding the residual block output from the inverse transformer and the predicted block output from the inter-predictor or the intra-predictor. The pixels in the reconstructed current block are used as reference pixels for intra-prediction of a block to be decoded later.

The filter unit 460 may include a deblocking filter 462 and an SAO filter 464. The deblocking filter 462 performs deblocking filtering on the boundary between reconstructed blocks to remove blocking artifacts caused by block-by-block decoding. The SAO filter 464 performs additional filtering on a reconstructed block after deblocking filtering in order to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of a block in a picture to be encoded thereafter.

The present disclosure proposes new methods for determining a prediction mode of a target block to be encoded and/or decoded (i.e., current block), and performing prediction on the current block based thereon.

The prediction modes determined in the methods of the present disclosure may be broadly divided into an inter mode, an intra mode, and a current picture referencing (cpr) mode. The cpr mode may be referred to as an intra block copy (ibc) mode. The inter mode may include a skip mode, a merge mode, and an AMVP mode. The cpr mode, that is, the ibc mode, may include an ibc_skip mode, an ibc_merge mode, and an ibc_BVP mode. The ibc_skip mode is a mode formed by applying the ibc mode to the skip mode. The ibc_merge mode is a mode formed by applying the ibc mode to the merge mode. The ibc_BVP mode is formed by applying the ibc mode to the AMVP mode.

Figure 5:
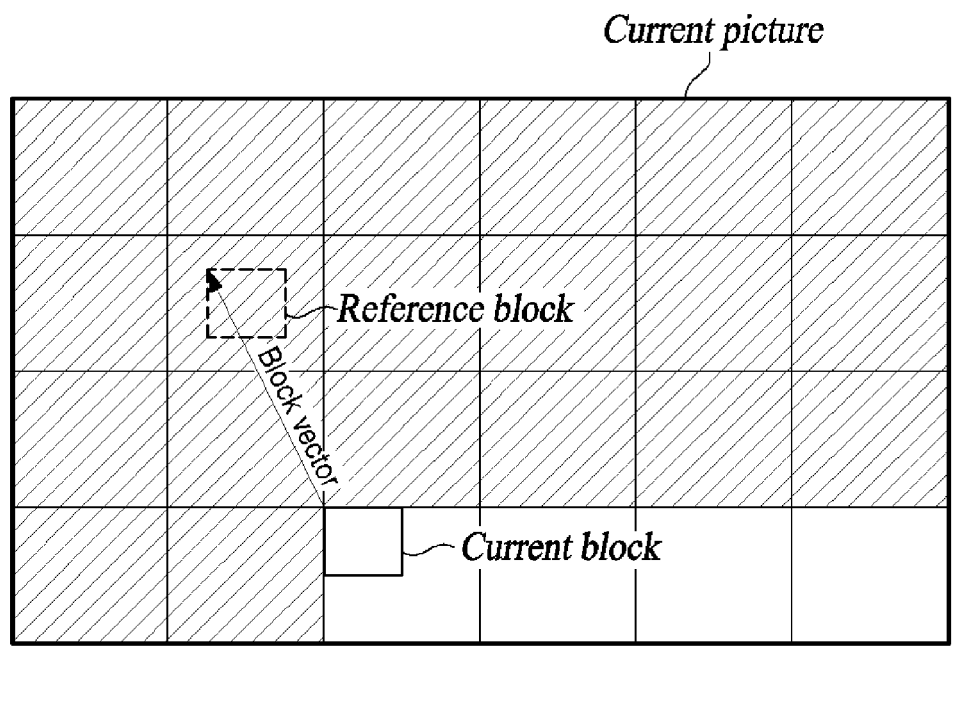
FIG. 5 is a diagram illustrating a current picture reference technique.

The ibc mode is one of intra prediction methods, and an example of the ibc mode is shown in FIG. 5. As illustrated in FIG. 5, in the ibc mode, prediction information about a current block is acquired from another block (reference block) positioned in the same picture (current picture).

Among the blocks included in the current picture of FIG. 5, blocks marked with a hatch pattern represent blocks or regions that have already been decoded, and blocks not marked with a hatch pattern represent blocks or regions that have not been decoded yet. Accordingly, the reference block from which the prediction information about the current block is acquired corresponds to a block that has already been decoded. The reference block is indicated by a motion vector (MV). In the ibc mode, the MV may be referred to as a block vector (BV).

In the ibc mode, prediction information about the current block is acquired from a reference block indicated by the BV. On the other hand, in the intra mode, prediction information is acquired from pixels adjacent to the current block. Also, in the ibc mode, prediction information is acquired from a reference block positioned in the same picture. On the other hand, in the inter mode, prediction information is acquired from a reference block positioned in a different picture.

In the conventional method of determining the prediction mode, operation S610 of determining a type (slice_type!=I) of a slice including the current block is performed first. The slice types may include an intra-slice (I-slice), a predictive slice (P-slice), and a bi-predictive slice (B-slice).

For the I-slice, only intra prediction is allowed. Accordingly, when the current block is included in the I-slice, operation S692 of parsing and decoding information required for intra prediction is performed. In contrast, for the P-slice and the B-slice, both inter prediction and intra prediction are allowed. Therefore, when the current block is not included in the I-slice, additional determination operations are performed for the current block.

First, operation S620 of parsing and decoding a flag (skip_flag) indicating whether a current block is predicted in a skip mode is performed and followed by operation S630 of evaluating skip_flag. When skip_flag is on (skip_flag=1), the prediction mode of the current block corresponds to the skip mode. Accordingly, in order to acquire motion information used for skip mode prediction, operation S680 of parsing and decoding merge_index is further performed.

In contrast, when skip_flag is off (skip_flag=0), the prediction mode of the current block may correspond to any one of the modes (merge mode, AMVP mode, and intra mode) other than the skip mode. In order to clearly specify the prediction mode, operation S640 of parsing and decoding a flag indicating whether the current block is predicted in the inter mode or the intra mode (a flag pred_mode_flag indicating whether the current block is predicted in the intra mode) and operation S650 of evaluating pred_mode_flag are performed.

When pred_mode_flag indicates the inter mode, the prediction mode of the current block may correspond to either the merge mode or the AMVP mode. To clearly specify the prediction mode, operation S660 of parsing and decoding a flag (merge_flag) indicating whether the current block is predicted in the merge mode and operation S670 of evaluating merge_flag are performed.

When merge_flag is on (merge_flag=1), the prediction mode of the current block corresponds to the merge mode. Accordingly, operation S680 of parsing and decoding merge_index is performed. In contrast, when merge_flag is off (merge_flag=0), the prediction mode of the current block corresponds to the AMVP mode. Accordingly, operation S690 of parsing and decoding motion information required for AMVP prediction is performed.

Returning to operation S650 again, when pred_mode_flag indicates the intra mode, operation S692 of parsing and decoding information required for intra prediction is performed.

Figure 6:
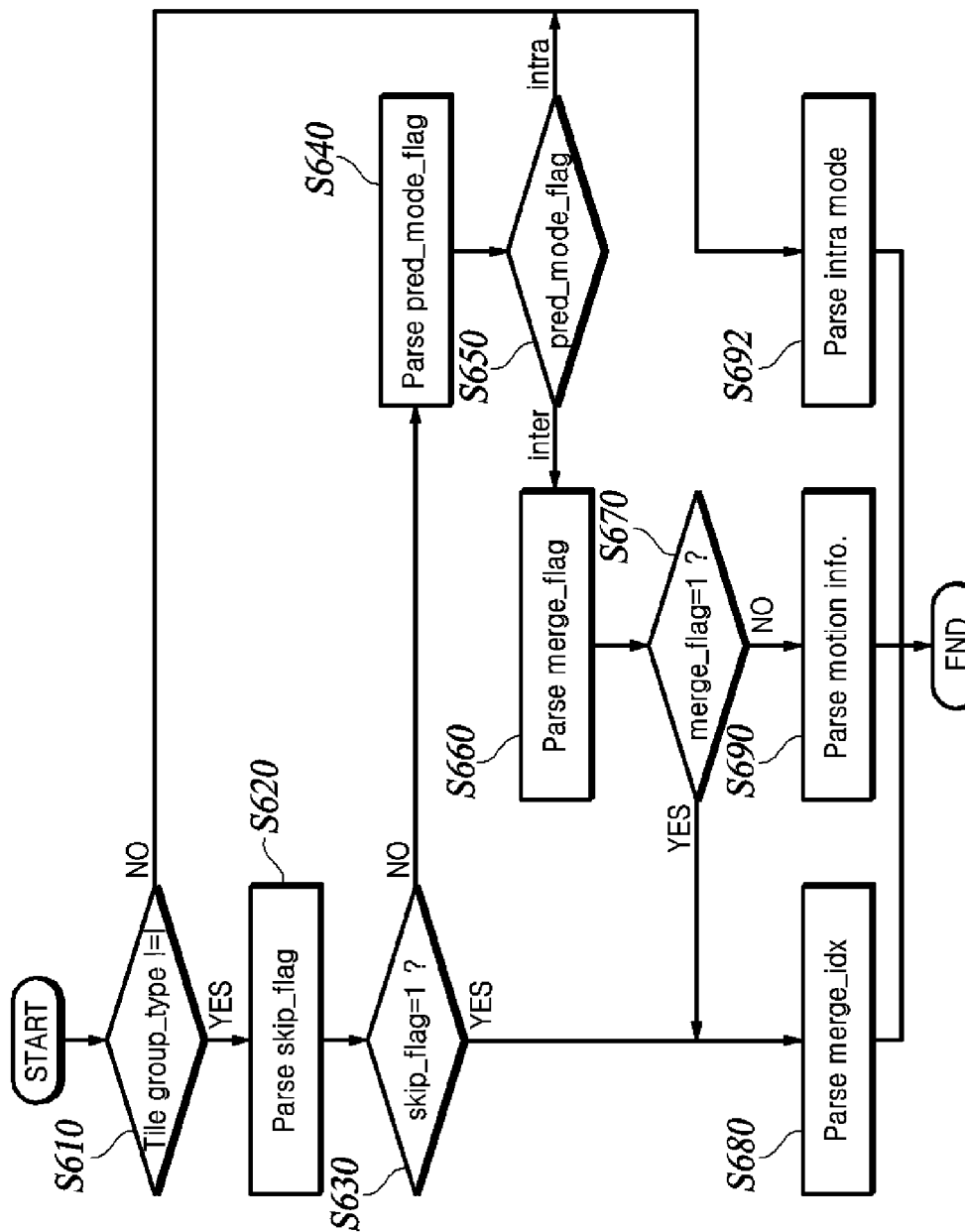
FIG. 6 is a diagram illustrating a conventional method of classifying prediction modes.
Figure 7:
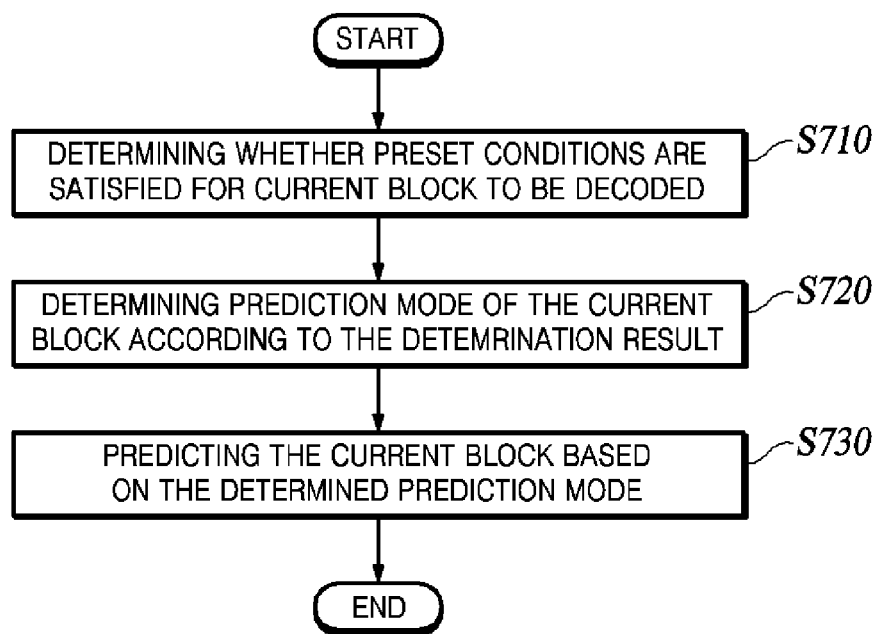
FIG. 7 is a flowchart illustrating an example of determining a prediction mode proposed in the present disclosure.
Figure 8:
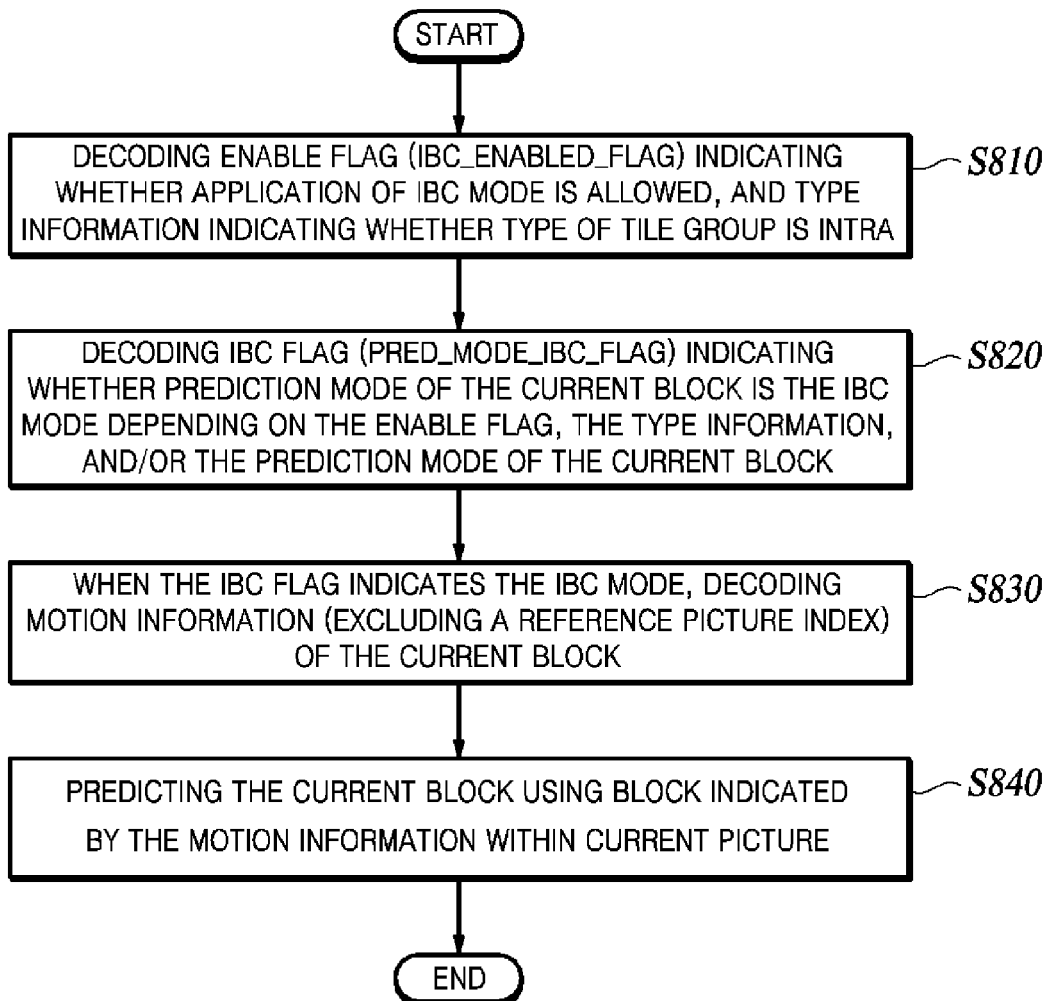
FIG. 8 is a flowchart illustrating an example of predicting a current block in a current picture referencing mode.

In the conventional method described with reference to FIG. 6, the ibc mode may be applied based on whether the picture in which a reference block for the current block is located is the same as the current picture. For example, when it is determined that the prediction mode of the current block is the skip mode or merge mode, and the reference picture of a merge candidate indicated by merge_idx is the same as the current picture, the current block may be predicted in ibc_skip mode or ibc_merge mode.

As another example, when it is determined that the prediction mode of the current block is the AMVP mode, and the reference picture index (ref_idx) signaled from the video encoding device indicates the same picture as the current picture, the current block may be predicted in the ibc_BVP mode.

Whether the ibc mode is on/off may be defined by using separate flags (sps_curr_pic_ref_enabled_flag and pps_curr_pic_ref_enabled_flag), and Tables 1 and 2 below show an example of defining whether the ibc mode is on/off by using each of the aforementioned flags.

TABLE 1

|  | Descriptor |
|---|---|
| sps_scc_extension( ) { | |
|    sps_curr_pic_ref_enabled_flag | u(1) |
|    palette_mode_enabled_flag | u(1) |
|    if( palette_mode_enabled_flag ) { | |
|    } | |
| } | |

|  | Descriptor |
|---|---|
| pps_scc_extension( ) { | |
|   pps_curr_pic_ref_enabled_flag | u(1) |
|   residual_adaptive_colour_transform_enabled_flag | u(1) |
|   if( residual_adaptive_colour_transform_enabled_flag ) { | |
|   } | |
|   pps_palette_predictor_initializer_present_flag | u(1) |
| } | |

In order to determine whether the reference picture of the merge candidate is the same as the current picture and whether the reference picture index indicates the same picture as the current picture, the current picture should be added to the reference picture list. Equation 1 below is an example of addition of the current picture to the reference picture list.

$$\text{if(pps\_curr\_pic\_ref\_enabled\_flag) RefPicListTemp0}[\text{rIdx}{+}{+}]{=}\text{currPic} \quad [\text{Equation 1}]$$

The present disclosure proposes new syntax and semantics for distinguishing prediction modes of a current block. The present disclosure also proposes syntax and semantics for a current block encoded (predicted) in the ibc mode by a video encoding device. Furthermore, the present disclosure proposes new BVP candidates included in the BVP candidate list for the current block predicted in the ibc_BVP mode.

In the present disclosure, the video encoding device determines a prediction mode of the current block based on whether preset conditions are satisfied, and signals to the video decoding device by including, in a bitstream, syntax elements indicating whether the preset conditions are satisfied. The video decoding device determines whether the preset conditions are satisfied (S710), and determines a prediction mode of the current block based on the result of the determination (S720). Also, the video decoding device predicts the current block based on the determined prediction mode (S730).

The "preset conditions" means criteria for determining a prediction mode of the current block. The preset conditions may include whether the type of "the tile group containing the current block" (hereinafter referred to simply as "tile group") is "intra" (or whether the type of the tile group is "inter"), and whether the ibc mode is active (on) (whether application of the ibc mode is allowed), and whether the prediction mode of the current block is the merge mode. The preset conditions may also include whether the current block is encoded in the intra mode (or inter mode) and whether the prediction mode of the current block is the ibc mode.

Type information may be introduced to indicate whether the type of the tile group is intra. The type information may be signaled with a predefined syntax element (e.g., tile_group_type). In this specification, the evaluation of the type information may be expressed as "tile group=inter?". Here, the tile group may be referred to as a tile or a slice. Accordingly, "whether the type of the tile group is intra" may be differently understood as "whether the type of the tile is intra" or "whether the type of the slice is intra."

An enable flag may be introduced to indicate whether the application of the ibc mode is allowed. The enable flag may be implemented with a predefined syntax element (e.g., ibc_enabled_flag). The syntax element ibc_enabled_flag may be defined at one or more positions among the SPS, PPS, tile group header, tile header, and CTU header.

A syntax element (merge_flag) may be introduced to indicate whether the prediction mode of the current block is the merge mode. A syntax element (pred_mode_flag) may be introduced to indicate whether the current block is encoded in the inter mode (or intra mode). A syntax element (pred_mode_ibc_flag) may be introduced to indicate whether the prediction mode of the current block is the ibc mode.

An example of the process of determining the prediction mode of the current block as the ibc_BVP mode by applying all or part of the preset conditions will be described below.

When the video encoding device transmits a bitstream containing the enable flag and type information on the tile group, the video decoding device (i.e., the decoder) decodes the enable flag and type information from the bitstream (S810).

In addition, the video encoding device transmits a bitstream selectively containing the ibc flag according to the indication of the enable flag, the type information, and/or the prediction mode of the current block. The decoder 410 decodes the ibc flag depending on the decoded enable flag, type information, and/or prediction mode of the current block (S820). For example, the video decoding device may decode the ibc flag when the enable flag is on and the type information indicates intra. In addition, the video decoding device decodes the ibc flag when the enable flag is on, the type information indicates inter (i.e., the type information does not indicate intra), and the prediction mode is inter (i.e., prediction mode is not intra).

When the ibc flag indicates the ibc mode, the video encoding device transmits a bitstream containing motion information about the current block, and the video decoding device decodes the motion information contained in the bitstream (S830). The reference picture index is not included in the motion information about the current block to be decoded.

The video decoding device (i.e., the predictor) predicts the current block based on the block (reference block) indicated by the decoded motion information (S840). The reference block corresponds to a block positioned in the same picture (current picture) as the current block.

As described above, in the present disclosure, it may be determined that the current block has been predicted in the ibc mode (ibc_BVP mode), using a separate syntax element (pred_mode_ibc_flag). Accordingly, the method of the present disclosure differs from the conventional method, which determines that the current block has been predicted in the ibc_BVP mode using the reference picture index signaled from the video encoding device.

According to this difference, the conventional method requires parsing all of the BVP index (BVP_idx), the BVD, and the reference picture index, whereas the method of the present disclosure requires parsing only the BVP index and the BVD. That is, according to the present disclosure, the current block may be predicted in the ibc_BVP mode based only on the BVP index and BVD without signaling of the reference picture index, and therefore bit efficiency may be improved.

Embodiments described below may be implemented in both the video encoding device and the video decoding device in the same manner For the sake of brevity and clarity, the description below is focused on the video decoding device. However, the operation of parsing and decoding a certain syntax element by the decoder 410 or the video decoding device is preferably understood as an operation of the video encoding device encoding the certain syntax element and including the same in a bitstream.

Embodiment 1

Embodiment 1 corresponds to an example in which the prediction mode of the current block is determined based on whether preset conditions are satisfied, and the current block is predicted in the determined prediction mode.

Embodiment 1-1

Figure 9:
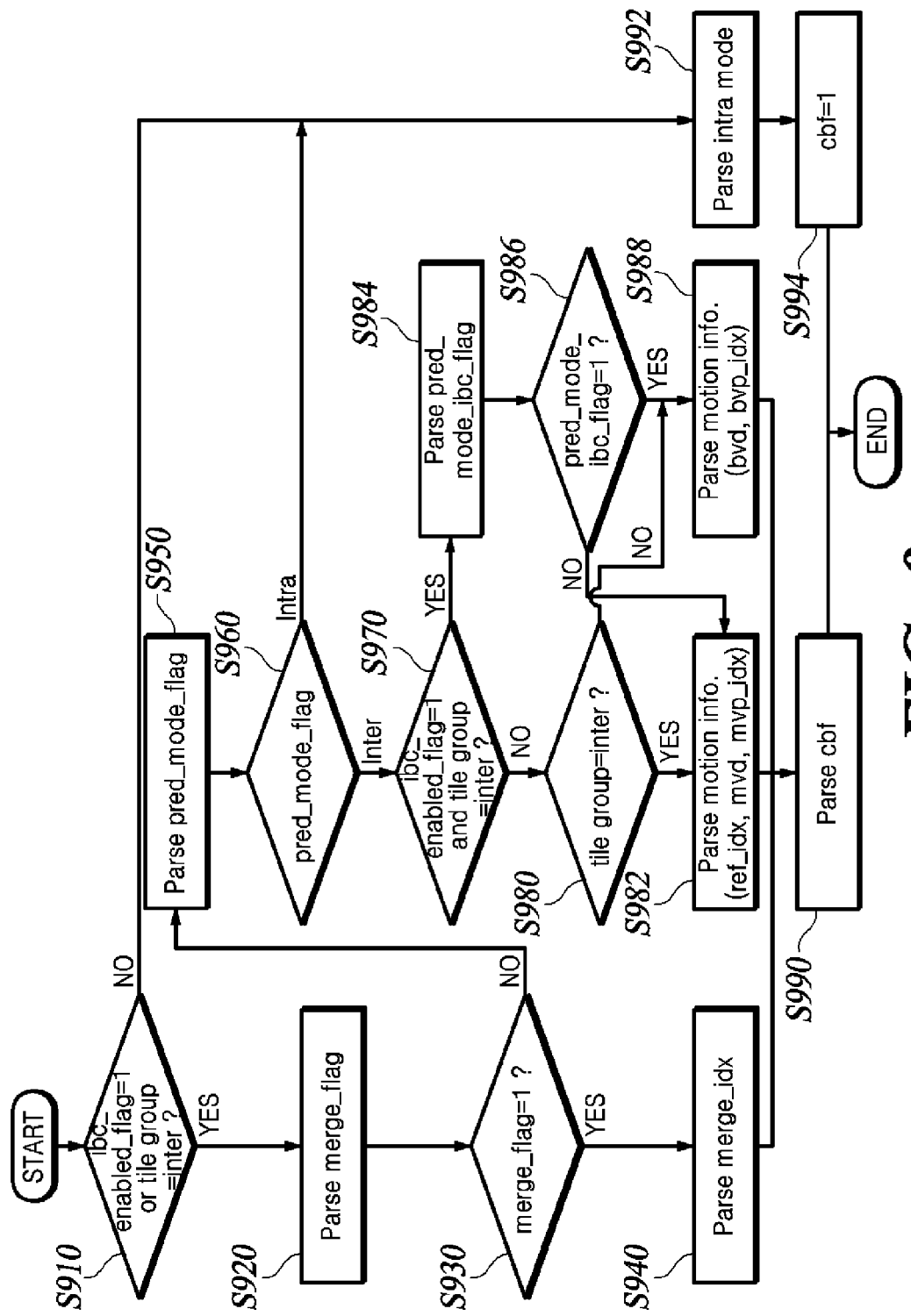

As shown in FIG. 9, Embodiment 1-1 may use all or part of whether the application of the ibc mode is allowed, whether the type of the tile group is intra, whether the prediction mode of the current block is the merge mode, whether the prediction mode of the current block is the ibc mode, and whether the current block is encoded by inter prediction.

Skip Mode, Merge Mode, ibc Skip Mode, and ibc Merge Mode

When the enable flag and type information are decoded, the video decoding device may determine whether the application of the ibc mode is allowed or whether the type of the tile group is intra, based on the decoded information (S910).

In operation S910, when the enable flag indicates that the application of the ibc mode is allowed or the type information indicates that the type is not intra (i.e., when the application of the ibc mode is not allowed and the type of the tile group is inter, or when the application of the ibc mode is allowed and the type of the tile group is intra, and when the application of the ibc mode is allowed and the type of the tile group is inter), the video decoding device parses and decodes the merge_flag (S920), and evaluates the merge_flag (S930).

In operation S930, when the merge_flag indicates that "the prediction mode of the current block is the merge mode," the prediction mode of the current block may correspond to any one of the skip mode, the merge mode, the ibc_skip mode, and the ibc_merge mode. In this case, the video decoding device may distinguish the skip/merge mode and the ibc_skip/ibc_merge mode using merge_idx parsed and decoded through operation S940.

When the reference picture of the merge candidate indicated by the decoded merge_idx is the same as the current picture, the prediction mode of the current block corresponds to the ibc_skip/ibc_merge mode. In contrast, when the reference picture of the merge candidate indicated by the decoded merge_idx is not the same as the current picture, the prediction mode of the current block corresponds to the skip/merge mode.

The distinction between the skip mode and the merge mode and between the ibc_skip mode and the ibc_merge mode may be determined according to whether the information (e.g., cbf) parsed and decoded through the operation S990 indicates 1 or 0.

AMVP Mode

The video decoding device may determine whether the application of the ibc mode is allowed or the type of the tile group is intra, based on the enable flag and the type information (S910), parse and decode information indicating whether the prediction mode of the current block is the merge mode (S920), and evaluate the same (S930).

When merge_flag does not indicate the merge mode in operation S930, the prediction mode of the current block may correspond to any one of the AMVP mode, the ibc_BVP mode, and the intra mode. In order to specify the prediction mode of the current block among the AMVP mode, the ibc_BVP mode, and the intra mode, the video decoding device may parse and decode the mode information (pred_mode_flag) (S950), and may evaluate the pred_mode_flag (S960).

In operation S960, when the pred_mode_flag indicates inter prediction (i.e., intra prediction is not indicated), the video decoding device may determine whether to parse a separate syntax (pred_mode_ibc_flag) indicating that the current block has been predicted in the ibc mode, based on the enable flag and type information (S970). That is, in operation S960, when the prediction mode is not intra prediction, the video decoding device may determine whether to parse the pred_mode_ibc_flag based on the enable flag and the type information (S970).

In operation S970, when the enable flag does not indicate that application of the ibc mode is allowed or the type information indicates that the type is intra, the video decoding device may re-evaluate the type information (S980). When the type information indicates inter in operation S980, the prediction mode of the current block corresponds to the AMVP mode. Accordingly, the video decoding device may parse and decode motion information (ref_idx, mvd, mvp_idx) for predicting the current block in the AMVP mode (S982).

In other words, in operation S970, operation S980, and operation S982, it may understood that the video decoding device parses and decodes motion information for prediction of the current block in the AMVP mode when the ibc mode is not allowed and the type of the tile group is inter.

In operation S970, when the enable flag indicates that the application of the ibc mode is allowed and the type information indicates inter (i.e., indicates that the type is not intra), the video decoding device may parse and decode pred_mode_ibc_flag (S984), and evaluate pred_mode_ibc_flag (S986). Even when pred_mode_ibc_flag does not indicate the ibc mode in operation S986, the prediction mode of the current block corresponds to the AMVP mode. Accordingly, the video decoding device may parse and decode the motion information for predicting the current block in the AMVP mode (S982).

ibc BVP Mode

The video decoding device may determine whether the application of the ibc mode is allowed and the type of the tile group is intra, based on the enable flag and the type information (S970).

In operation S970, when the enable flag indicates that application of the ibc mode is allowed and the type information indicates inter, the video decoding device may parse and decode pred_mode_ibc_flag (S984) and evaluate pred_mode_ibc_flag (S986). When pred_mode_ibc_flag indicates the ibc mode in operation S986, the prediction mode of the current block corresponds to the ibc_BVP mode. Accordingly, the video decoding device may parse and decode motion information (bvd, bvp_idx) for predicting the current block in the ibc_BVP mode (S988).

When the enable flag indicates that the application of the ibc mode is not allowed or the type information indicates intra in operation S970, the video decoding device may re-evaluate the type information (S980). Even when the type information does not indicate inter (i.e., it indicates intra) in operation S980, the prediction mode of the current block corresponds to the ibc_BVP mode. Accordingly, the video decoding device may parse and decode the motion information (bvd, bvp_idx) for predicting the current block in the ibc_BVP mode (S988).

According to an embodiment, the video decoding device may further perform operations of parsing and decoding the mode information (pred_mode_flag) (S950) and evaluating the same (S960) before operation S970. In this embodiment, when it is indicated that the prediction mode of the current block is not intra prediction (i.e., the mode is inter prediction) in operation S960, the video decoding device may perform operation S970 and the operations subsequent to operation S970.

In an embodiment, the video decoding device may perform operation S910 process, operation S920 and operation S930 before operation S950. In this embodiment, when the merge_flag does not indicate the merge mode in operation S930, operation S950 may be performed.

Intra Mode

In operation S910, when the enable flag indicates that application of the ibc mode is not allowed and the type information indicates intra, the prediction mode of the current block corresponds to the intra mode. Accordingly, the video decoding device may parse and decode the information for predicting the current block in the intra mode (S992).

In operation S960, even when the mode information does not indicate inter prediction, the prediction mode of the current block corresponds to the intra mode. Accordingly, the video decoding device may parse and decode the information for predicting the current block in the intra mode (S992). In the case of the intra mode, cbf is not signaled is inferred as "1" (S994).

The number of bits consumed or allocated to determine the prediction mode for the current block based on Embodiment 1-1 is presented in FIG. 10.

In FIG. 10, "tile group type" is an item indicating which of I-type, P-type, and B-type corresponds to the tile group. When the tile group corresponds to the I-type, it is determined that tile groupinter. When the tile group corresponds to the P-type or B-type, it is determined that tile group=inter.

"CU type" is an item indicating whether the current block has been predicted in the inter mode or intra mode, and CU mode is an item indicating a mode in which the current block has been predicted among the skip mode, merge mode, AMVP mode, ibc_skip mode, ibc_merge mode, and ibc_BVP mode.

"mode" is an item indicating whether each of merge_flag, pred_mode_flag, and pred_mode_ibc_flag is on/off in the entire operation of determining the prediction mode of the current block. ref_idx is an item indicating whether a reference picture index is signaled. cbf is an item indicating whether all the transform coefficients for the current block are zero or whether the transform coefficients have one or more non-zero values.

"Total bits" is an item indicating the number of bits consumed or allocated to determine the prediction mode of the current block for each prediction mode, and "ibc=off" is an item indicating bits consumed in each operation when ibc_enabled_flag is off. That is, the above-described items excluding the item ibc=off represent the number of bits on the assumption that the ibc_enabled_flag is on (assuming that the ibc method is applied).

Hereinafter, the number of bits allocated to determine each prediction mode on the assumption that ibc_enabled_flag=1 will be described first, and then the number of bits allocated to determine each prediction mode on the assumption that ibc_enabled_flag=0 will be described.

Assuming that the tile group type is the P-type or B-type and the CU type is inter, tile group=inter is additionally premised. Therefore, when the CU mode is skip, merge_flag=1, ref_idx is not signaled, and cbf=0. Thus, 2 bits are allocated to determine the skip mode.

When the CU mode is merge, merge_flag=1, ref_idx is not signaled, and cbf=1. Thus, 2 bits are allocated to determine the merge mode. When the CU mode is AMVP, merge_flag=0, pred_mode_flag=1, pred_mode_ibc_flag=0, ref_idx=0, and cbf=0 or 1. Thus, 5 bits are allocated to determine the AMVP mode.

When the tile group type is P-type or B-type and the CU type is intra, 2 bits (merge_flag=0 and pred_mode_flag=0) are allocated to determine that the CU mode is the intra mode. In this case, cbf is not signaled, but is derived as 1.

In addition, 2 bits (merge_flag=1 and cbf=0) are allocated to determine that the CU mode is ibc_skip, and 2 bits (merge_flag=1 and cbf=1) are allocated to determine that the CU mode is ibc_merge. Also, 4 bits (merge_flag=0, pred_mode_flag=1, pred_mode_ibc_flag=1, cbf=0 or 1) are allocated to determine that the CU mode is ibc_BVP.

When the tile group type is I-type (when the CU type is intra), tile groupinter is additionally premised in addition to ibc_enabled_flag=1. Accordingly, 2 bits (merge_flag=0 and pred_mode_flag=0) are allocated to determine that the CU type is the intra mode.

In addition, 2 bits (merge_flag=1 and cbf=0) are allocated to determine that the CU mode is ibc_skip, and 2 bits (merge_flag=1 and cbf=1) are allocated to determine that the CU mode is ibc_merge. Also, 3 bits (merge_flag=0, pred_mode_flag=1, cbf=0 or 1) are allocated to determine that the CU mode is ibc_BVP.

The number of bits consumed or allocated to determine the prediction mode for the current block when the ibc function is off (ibc_enabled_flag=0), is presented in the item ibc=off. Since the ibc function is off, it is assumed that the tile group type corresponds to the P-type or the B-type, the CU type corresponds to inter, and pred_mode_ibc_flag=0.

When the CU mode is skip, merge_flag=1, ref_idx is not signaled, and cbf=0. Thus, 2 bits are allocated to determine the skip mode. When the CU mode is merge, merge_flag=1, ref_idx is not signaled, and cbf=1. Thus, 2 bits are allocated to determine the merge mode. When the CU mode is AMVP, merge_flag=0, pred_mode_flag=1, ref_idx=0, and cbf=0 or 1. Thus, 4 bits are allocated to determine the AMVP mode.

Embodiment 1-2

Figure 11:
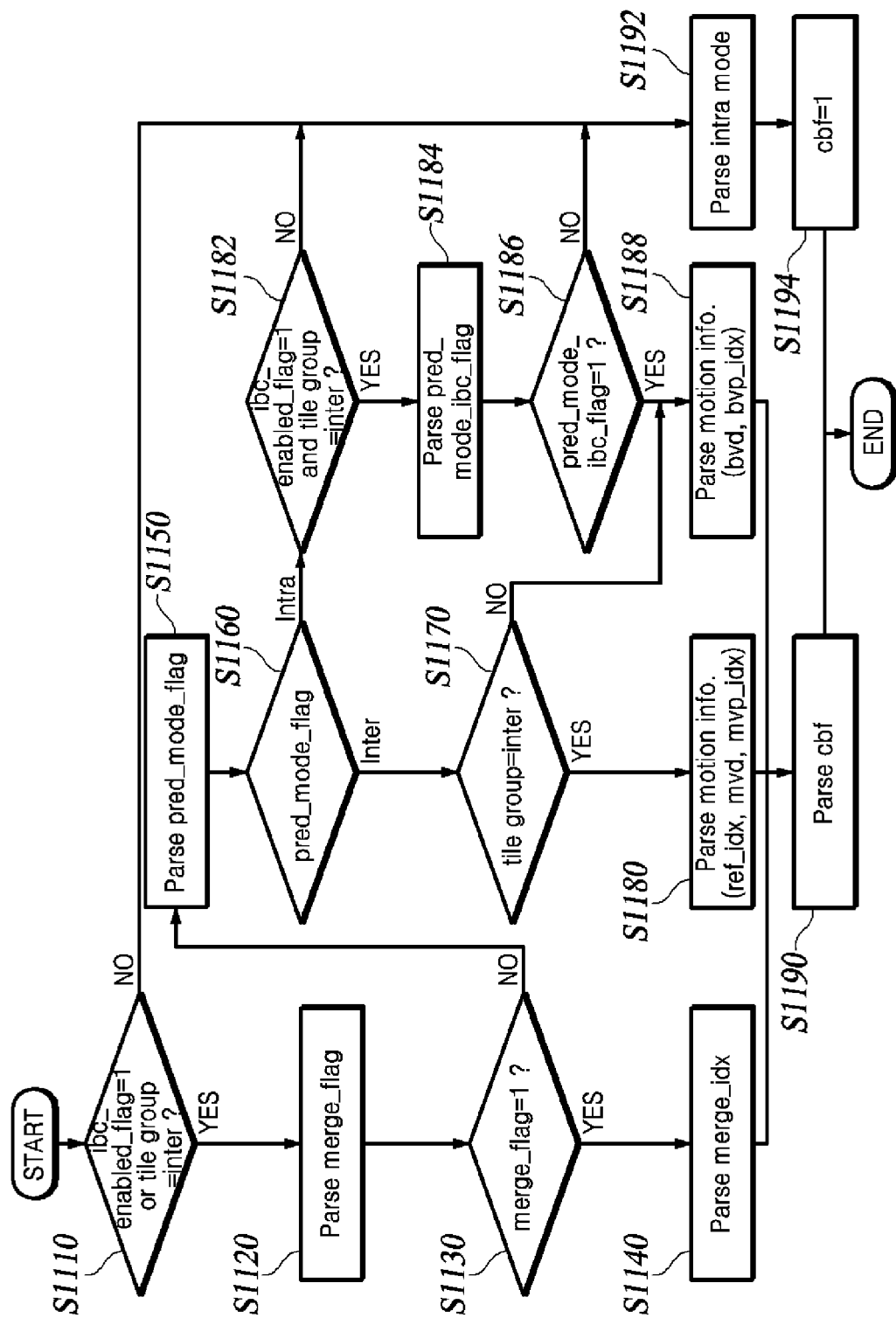

Embodiment 1-2 corresponds to another example in which the prediction mode of a current block is determined using a new syntax and semantics, and the current block is predicted based on the determined prediction mode. As shown in FIG. 11, in Embodiment 1-2, part or all of preset conditions may be applied to determine the prediction mode of the current block.

Skip Mode, Merge Mode, ibc Skip Mode and ibc Merge Mode

The video decoding device may determine whether the application of the ibc mode is allowed or the type of the tile group is intra, based on the enable flag and type information (S1110). In operation S1110, when the enable flag indicates that the application of the ibc mode is allowed or the type information indicates inter, the video decoding device may parse and decode merge_flag (S1120), and evaluate the same (S1130).

When merge_flag indicates the merge mode in operation S1130, the video decoding device may distinguish between the skip/merge mode and the ibc_skip/ibc_merge mode based on merge_idx parsed and decoded through operation S1140. Specifically, when the reference picture of the merge candidate indicated by the decoded merge_idx is the same as the current picture, the prediction mode of the current block corresponds to the ibc_skip/ibc_merge mode. When the reference picture of the merge candidate indicated by the decoded merge_idx is not the same as the current picture, the prediction mode of the current block corresponds to the skip/merge mode.

The distinction between the skip mode and the merge mode, and between the ibc_skip mode and the ibc_merge mode may be determined according to whether cbf parsed and decoded through operation S1190 indicates 1 or 0.

AMVP Mode

When merge_flag does not indicate the merge mode in operation S1130, the video decoding device may parse and decode the mode information (pred_mode_flag) (S1150) and evaluate pred_mode_flag (S1160).

When pred_mode_flag indicates inter prediction in operation S1160, the video decoding device may evaluate type information (S1170). When the type information indicates inter in operation S1170, the prediction mode of the current block corresponds to the AMVP mode. Accordingly, the video decoding device may parse and decode motion information (ref_idx, mvd, mvp_idx) for predicting the current block in the AMVP mode (S1180).

ibc BVP Mode

The video decoding device may determine whether the application of the ibc mode is allowed and the type of the tile group is intra, based on the enable flag and the type information (S1182).

In operation S1182, when the enable flag indicates that application of the ibc mode is allowed and the type information indicates inter, the video decoding device may parse and decode pred_mode_ibc_flag (S1184) and evaluate pred_mode_ibc_flag (S1186). When pred_mode_ibc_flag indicates the ibc mode in operation S1186, the prediction mode of the current block corresponds to the ibc_BVP mode. Accordingly, the video decoding device may parse and decode motion information (bvd, bvp_idx) for predicting the current block in the ibc_BVP mode (S1188).

Even when the type information indicates intra in operation S1170, the prediction mode of the current block corresponds to the ibc_BVP mode. Accordingly, the video decoding device may parse and decode the motion information (bvd, bvp_idx) for predicting the current block in the ibc_BVP mode (S1188).

According to an embodiment, the video decoding device may further perform operations of parsing and decoding the mode information (pred_mode_flag) (S1150) and evaluating the same (S1160) before operation S1182. In this embodiment, when pred_mode_flag does not indicate inter prediction in operation S1160, operation S1182 may be performed. When pred_mode_flag indicates inter prediction in operation S1160, operation S1170 may be performed.

In an embodiment, the video decoding device may perform operation S1110 process, operation S1120 and operation S1130 before operation S1150. In this embodiment, when the merge_flag does not indicate the merge mode in operation S1130, operation S1150 may be performed.

Intra Mode

In operation S1110, when the enable flag indicates that application of the ibc mode is not allowed and the type information indicates intra, the prediction mode of the current block corresponds to the intra mode. Accordingly, the video decoding device may parse and decode the information for predicting the current block in the intra mode (S1192).

In addition, even when the enable flag indicates that application of the ibc mode is not allowed or the type information indicates intra, the prediction mode of the current block corresponds to the intra mode in operation S1182. Accordingly, the video decoding device may parse and decode the information for predicting the current block in the intra mode (S1192).

Furthermore, even when pred_mode_ibc_flag does not indicate the ibc mode in operation S1186, the prediction mode of the current block corresponds to the intra mode. Accordingly, the video decoding device may parse and decode the information for predicting the current block in the intra mode (S1192). In the case of the intra mode, cbf is not signaled and is derived to be 1 (S1194).

The number of bits consumed or allocated to determine the prediction mode for a current block based on Embodiment 1-2 is presented in FIG. 12.

The items Tile group type, CU type, CU mode, mode, ref_idx, cbf, Total bits, and ibc=off of FIG. 12 have the same meaning as those of FIG. 10 described above.

Hereinafter, the number of bits allocated to determine each prediction mode on the assumption that ibc_enabled_flag=1 will be described first, and then the number of bits allocated to determine each prediction mode on the assumption that ibc_enabled_flag=0 will be described.

Assuming that the tile group type is the P-type or B-type and the CU type is inter, tile group=inter is additionally premised. Therefore, when the CU mode is skip, merge_flag=1, ref_idx is not signaled, and cbf=0. Thus, 2 bits are allocated to determine the skip mode.

When the CU mode is merge, merge_flag=1, ref_idx is not signaled, and cbf=1. Thus, 2 bits are allocated to determine the merge mode. When the CU mode is AMVP, merge_flag=0, pred_mode_flag=1, ref_idx=0, and cbf=0 or 1. Thus, 4 bits are allocated to determine the AMVP mode.

When the tile group type is P-type or B-type and the CU type is intra, 3 bits (merge_flag=0, pred_mode_flag=0, and pred_mode_ibc_flag=0) are allocated to determine that the CU type is the intra mode. In this case, cbf is not signaled, but is derived as 1.

In addition, 2 bits (merge_flag=1 and cbf=0) are allocated to determine that the CU mode is ibc_skip, and 2 bits (merge_flag=1 and cbf=1) are allocated to determine that the CU mode is ibc_merge. Also, 4 bits (merge_flag=0, pred_mode_flag=0, pred_mode_ibc_flag=1, cbf=0 or 1) are allocated to determine that the CU mode is ibc_BVP.

When the tile group type is I-type (when the CU type is intra), tile group inter is additionally premised in addition to the same ibc_enabled_flag=1. Accordingly, 2 bits (merge_flag=0 and pred_mode_flag=0) are allocated to determine that the CU type is the intra mode.

In addition, 2 bits (merge_flag=1 and cbf=0) are allocated to determine that the CU mode is ibc_skip, and 2 bits (merge_flag=1 and cbf=1) are allocated to determine that the CU mode is ibc_merge. Also, 3 bits (merge_flag=0, pred_mode_flag=1, cbf=0 or 1) are allocated to determine that the CU type is ibc_BVP.

The number of bits consumed or allocated to determine the prediction mode for the current block when the ibc function is off (ibc_enabled_flag=0), is presented in the item ibc=off. Since the ibc function is off, it is assumed that the tile group type corresponds to the P-type or the B-type, the CU type corresponds to inter, and pred_mode_ibc_flag=0.

When the CU mode is skip, merge_flag=1, ref_idx is not signaled, and cbf=0. Thus, 2 bits are allocated to determine the skip mode. When the CU mode is merge, merge_flag=1, ref_idx is not signaled, and cbf=1. Thus, 2 bits are allocated to determine the merge mode. When the CU mode is AMVP, merge_flag=0, pred_mode_flag=1, ref_idx=0, and cbf=0 or 1. Thus, 4 bits are allocated to determine the AMVP mode.

Embodiment 1-3

Figure 13:
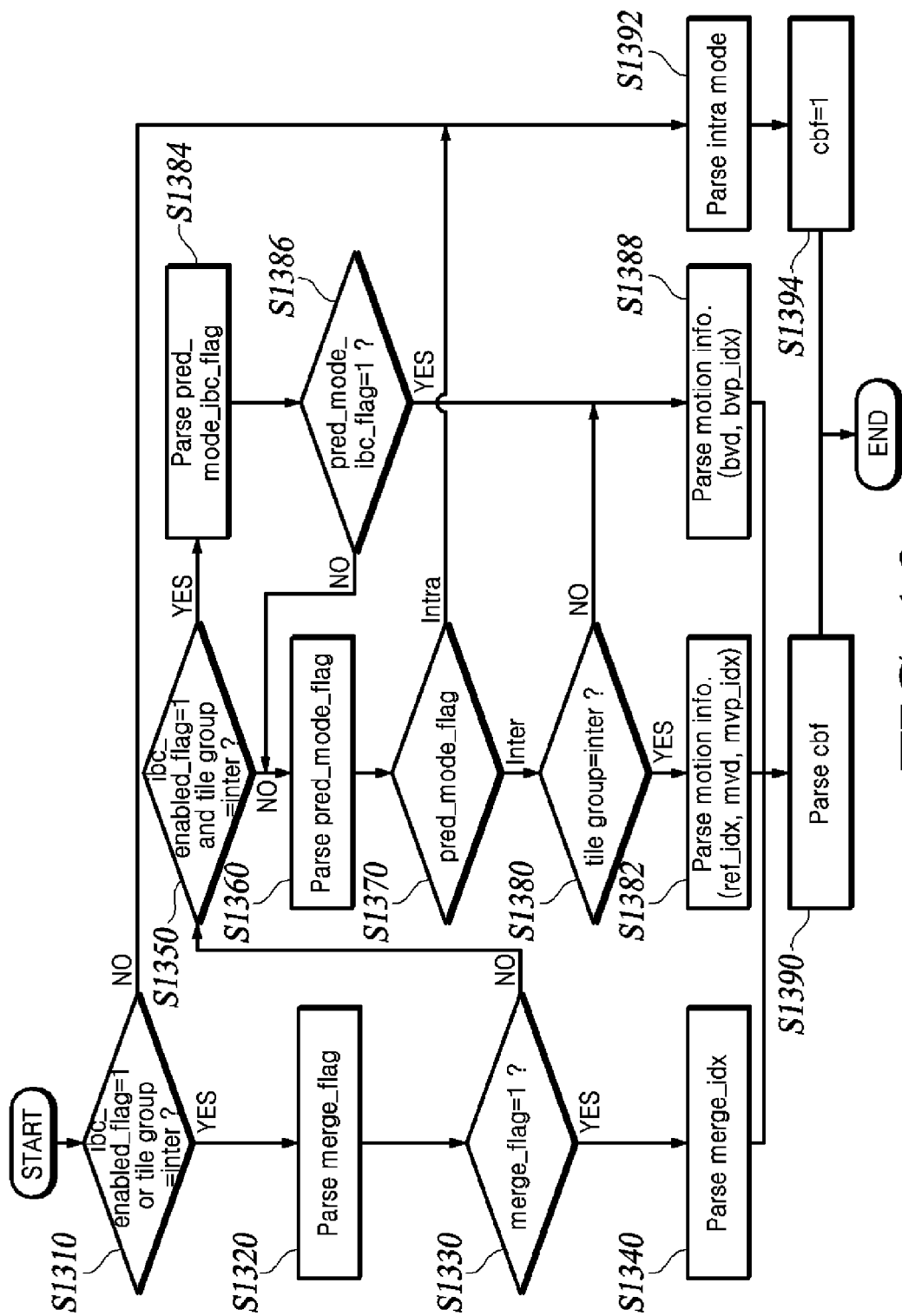
Figure 15:
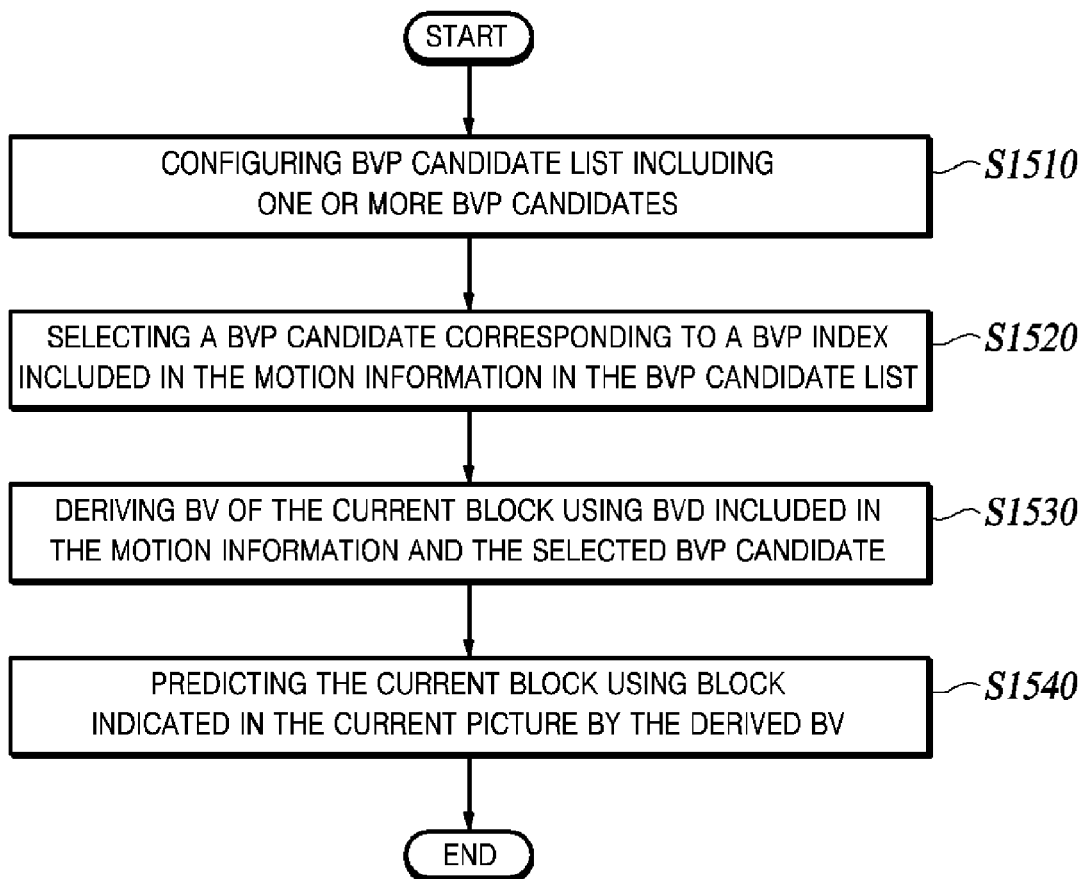
FIG. 15 is a flowchart illustrating predicting a current block in an ibc_BVP mode according to an embodiment of the present disclosure.

Embodiment 1-3 corresponds to another example in which the prediction mode of a current block is determined using a new syntax and semantics, and the current block is predicted based on the determined prediction mode. As shown in FIG. 13, in Embodiment 1-3, part or all of preset conditions may be applied to determine the prediction mode of the current block.

Skip Mode, Merge Mode, ibc Skip Mode and ibc Merge Mode

The video decoding device may determine whether the application of the ibc mode is allowed or the type of the tile group is intra, based on the enable flag and the type information (S1310). When the application of the ibc mode is allowed or the type of the tile group is inter, the video decoding device may parse and decode merge_flag (S1320), and evaluate the same (S1330).

When merge_flag indicates the merge mode in operation S1330, the prediction mode of the current block may correspond to one of the skip mode, the merge mode, the ibc_skip mode, and the ibc_merge mode. The video decoding device may distinguish between the skip/merge mode and the ibc_skip/ibc_merge mode based on merge_idx parsed and decoded through operation S1340.

The distinction between the skip mode and the merge mode, and between the ibc_skip mode and the ibc_merge mode may be determined according to whether cbf parsed and decoded through operation S1390 indicates 1 or 0.

AMVP Mode

When merge_flag does not indicate the merge mode in operation S1330, the video decoding device may evaluate the enable flag and type information (S1350). In operation S1350, when the enable flag indicates that application of the ibc mode is allowed and the type information indicates inter, the video decoding device may parse and decode pred_mode_ibc_flag (S1384), and evaluate pred_mode_ibc_flag (S1386).

When pred_mode_ibc_flag does not indicate the ibc mode in operation S1386, when the enable flag indicates that application of the ibc mode is not allowed or the type information indicates intra in operation S1350, the video decoding device may parse and decode mode information (pred_mode_flag) (S1360), and evaluate the same (S1370).

When pred_mode_flag indicates inter prediction in operation S1370, the video decoding device may evaluate type information (S1380). When the type information indicates inter in operation S1380, the prediction mode of the current block corresponds to the AMVP mode. Accordingly, the video decoding device may parse and decode information (ref_idx, mvd, mvp_idx) for predicting the current block in the AMVP mode (S1382).

ibc BVP Mode

The video decoding device may determine whether the application of the ibc mode is allowed and the type of the tile group is intra, based on the enable flag and the type information (S1350).

In operation S1350, when the enable flag indicates that application of the ibc mode is allowed and the type information indicates inter, the video decoding device may parse and decode pred_mode_ibc_flag (S1384) and evaluate pred_mode_ibc_flag (S1386). When pred_mode_ibc_flag indicates the ibc mode in operation S1386, the prediction mode of the current block corresponds to the ibc_BVP mode. Accordingly, the video decoding device may parse and decode motion information (bvd, bvp_idx) for predicting the current block in the ibc_BVP mode (S1388).

According to an embodiment, when the enable flag indicates that application of the ibc mode is not allowed or the type information indicates intra in operation S1350, the video decoding device may parse and decode mode information (pred_mode_flag) (S1360), and evaluate the same (S1370). When pred_mode_flag indicates inter prediction in operation S1370, the video decoding device may evaluate type information (S1380). When the type information indicates intra in operation S1380, the prediction mode of the current block corresponds to the ibc_BVP mode. Accordingly, the video decoding device may parse and decode motion information (bvd, bvp_idx) for predicting the current block in the ibc_BVP mode (S1388).

In an embodiment, the video decoding device may perform operation S1310 process, operation S1320 and operation S1330 before operation S1350. In this embodiment, when the merge_flag does not indicate the merge mode in operation S1330, operation S1350 may be performed.

Intra Mode

In operation S1310, when the enable flag indicates that application of the ibc mode is not allowed and the type information indicates intra, the prediction mode of the current block corresponds to the intra mode. Accordingly, the video decoding device parses and decodes the information for predicting the current block in the intra mode (S1392).

In addition, even when pred_mode_flag does not indicate inter prediction in operation S1370, the prediction mode of the current block corresponds to the intra mode. Accordingly, the video decoding device may parse and decode the information for predicting the current block in the intra mode (S1392). In the case of the intra mode, cbf is not signaled, but is derived to be 1 (S1394).

The number of bits consumed or allocated to determine the prediction mode for a current block based on Embodiment 1-3 is presented in FIG. 14. The items Tile group type, CU type, CU mode, mode, ref_idx, cbf, Total bits, and ibc=off of FIG. 14 have the same meaning as those of FIGS. 10 and 12 described above.

Assuming that the tile group type is the P-type or B-type and the CU type is inter, tile group=inter is additionally premised. Therefore, when the CU mode is skip, merge_flag=1, ref_idx is not signaled, and cbf=0. Thus, 2 bits are allocated to determine the skip mode. When the CU mode is merge, merge_flag=1, ref_idx is not signaled, and cbf=1. Thus, 2 bits are allocated to determine the merge mode. When the CU mode is AMVP, merge_flag=0, pred_mode_ibc_flag=0, pred_mode_flag=1, ref_idx=0, and cbf=0 or 1. Thus, 5 bits are allocated to determine the AMVP mode.

When the tile group type is P-type or B-type and the CU type is intra, 3 bits (merge_flag=0, pred_mode_ibc_flag=0, and pred_mode_flag=0) are allocated to determine that the CU type is the intra mode. In this case, cbf is not signaled, but is derived as 1.

In addition, 2 bits (merge_flag=1 and cbf=0) are allocated to determine that the CU mode is ibc_skip, and 2 bits (merge_flag=1 and cbf=1) are allocated to determine that the CU mode is ibc_merge. Also, 3 bits (merge_flag=0, pred_mode_ibc_flag=1, cbf=0 or 1) are allocated to determine that the CU mode is ibc_BVP.

When the tile group type is I-type (when the CU type is intra), tile groupinter is additionally premised in addition to ibc_enabled_flag=1. Accordingly, 2 bits (merge_flag=0 and pred_mode_flag=0) are allocated to determine that the CU type is the intra mode.

In addition, 2 bits (merge_flag=1 and cbf=0) are allocated to determine that the CU mode is ibc_skip, and 2 bits (merge_flag=1 and cbf=1) are allocated to determine that the CU mode is ibc_merge. Also, 3 bits (merge_flag=0, pred_mode_flag=1, cbf=0 or 1) are allocated to determine that the CU mode is ibc_BVP.

The number of bits consumed or allocated to determine the prediction mode for the current block when the ibc function is off (ibc_enabled_flag=0), is presented in the item ibc=off. Since the ibc function is off, it is assumed that the tile group type corresponds to the P-type or the B-type, the CU type corresponds to inter, and pred_mode_ibc_flag=0.

When the CU mode is skip, merge_flag=1, ref_idx is not signaled, and cbf=0. Thus, 2 bits are allocated to determine the skip mode. When the CU mode is merge, merge_flag=1, ref_idx is not signaled, and cbf=1. Thus, 2 bits are allocated to determine the merge mode. When the CU mode is AMVP, merge_flag=0, pred_mode_flag=1, ref_idx=0, and cbf=0 or 1. Thus, 4 bits are allocated to determine the AMVP mode.

Embodiment 2

Hereinafter, various embodiments of the present disclosure of a method of configuring a prediction block vector candidate list (BVP candidate list) used in the ibc mode will be described with reference to FIGS. 15 to 18.

As described above, the present disclosure may be configured to explicitly signal pred_mode_ibc_flag to indicate that the prediction mode of the current block corresponds to an ibc mode (one of the ibc_skip mode, the ibc_merge mode, and the ibc_BVP mode).

When the prediction mode of the current block corresponds to the ibc_BVP mode, the video decoding device configures a BVP candidate list including one or more block vector predictor (BVP) candidates (S1510). In addition, the video decoding device selects a BVP candidate corresponding to the BVP index (included in the motion information) signaled from the video encoding device in the BVP candidate list (S1520). Thereafter, the video decoding device derives a block vector (BV) for the current block by summing the selected BVP candidate (selected BVP) and the BVD (included in the motion information) signaled from the video encoding device (S1530), and predict the current block by acquiring prediction information from a reference block in the current picture indicated by the derived BV (S1540).

Embodiment 2-1

The BVP candidate list configured through Embodiment 2-1 may include, as BVP candidates, 1) the BV of a block predicted in the ibc mode among one or more blocks (spatial neighbor blocks) spatially adjacent to the current block, 2) the BV of a block predicted in the ibc mode among one or more blocks (temporal neighbor blocks) temporally adjacent to the current block, and 3) a preset BV. That is, the BVP candidates included in the BVP candidate list may include the BV of a spatial neighbor block predicted in the ibc mode, the BV of a temporal neighbor block predicted in the ibc mode, and a preset BV.

Figure 16:
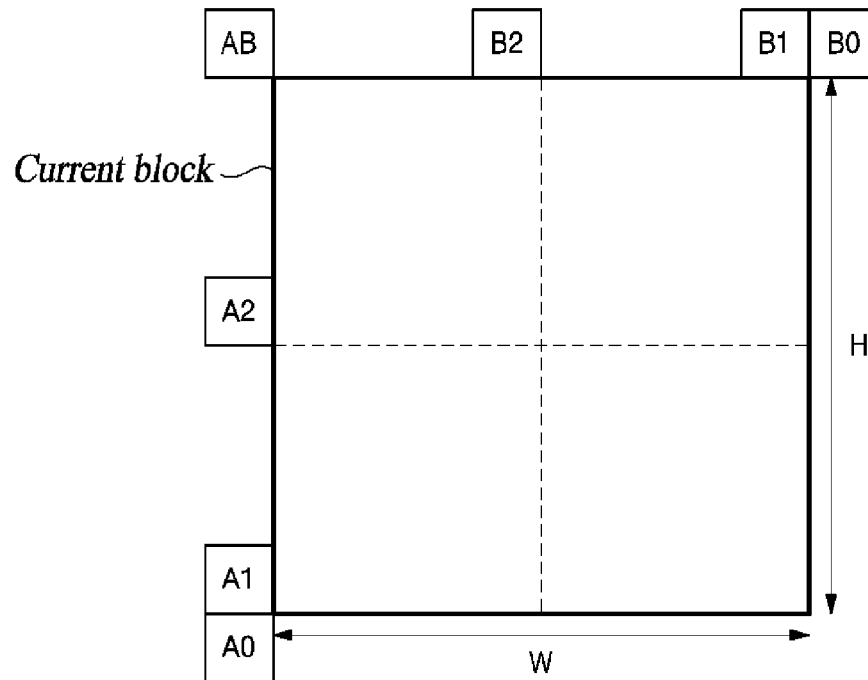
FIGS. 16 to 18 are diagrams illustrating BVP candidates included in a BVP candidate list for an ibc mode.

As shown in FIG. 16, the spatial neighbor blocks may include at least one of blocks A0, A1, and A2, which are positioned on the left side of the current block and/or at least one of blocks B0, B1 and B2, which are positioned above the current block. The spatial neighbor blocks may further include a block AB positioned at the upper left side of the current block. Here, block AB positioned at the upper left side of the current block may be treated as a block positioned on the left of the current block or may be treated as a block positioned above the current block.

The blocks positioned on the left side of the current block include block A1 positioned at a lower side and/or block A0 positioned at the bottom along the height H of the current block, or may further include block A2 positioned at the middle. The blocks positioned above the current block may include block B1 positioned at the right side and/or block B0 positioned on the right end along the width W of the current block, and may further include block B2 positioned at the middle.

When the positions of spatial neighbor blocks are represented based on pixels, A1 may be a block including the pixel positioned at the bottom left of the current block as a bottommost pixel thereof, and A2 may be a block including the pixel positioned at the center of the leftmost side of the current block as a bottom right pixel thereof. B1 may be a block including the top right pixel of the current block as a bottom right pixel thereof, and B2 may be a block including the pixel positioned at the top center of the current block as a bottom right pixel thereof. AB may be a block including the top leftmost pixel of the current block as a bottom right pixel thereof, A0 may be a block including the bottom leftmost pixel of the current block as a top rightmost pixel thereof, and B0 may be a block including the top right pixel of the current block as a bottom leftmost pixel thereof.

The video decoding device may derive one or more BVP candidates by searching for one or more blocks among the blocks positioned on the left side of the current block, and/or one or more blocks among the blocks positioned above the current block, and/or a block positioned at the top left of the current block in a preset order, and configure a BVP candidate list including the derived BVP candidates. For example, the video decoding device may derive BVP candidates by searching for block A1 positioned on the left side of the current block and block B1 positioned above of the current block according to a preset order, and configure a BVP candidate list including the derived BVP candidates.

In addition, the video decoding device may derive one or more BVP candidates by searching for blocks positioned on the left side of the current block (A0, A1, and/or A2, and/or AB) according to a preset order. Furthermore, the video decoding device may derive one or more BVP candidates by searching for blocks positioned above the current block (B0, B1 and/or B2 and/or AB) according to a preset order.

Figure 17:
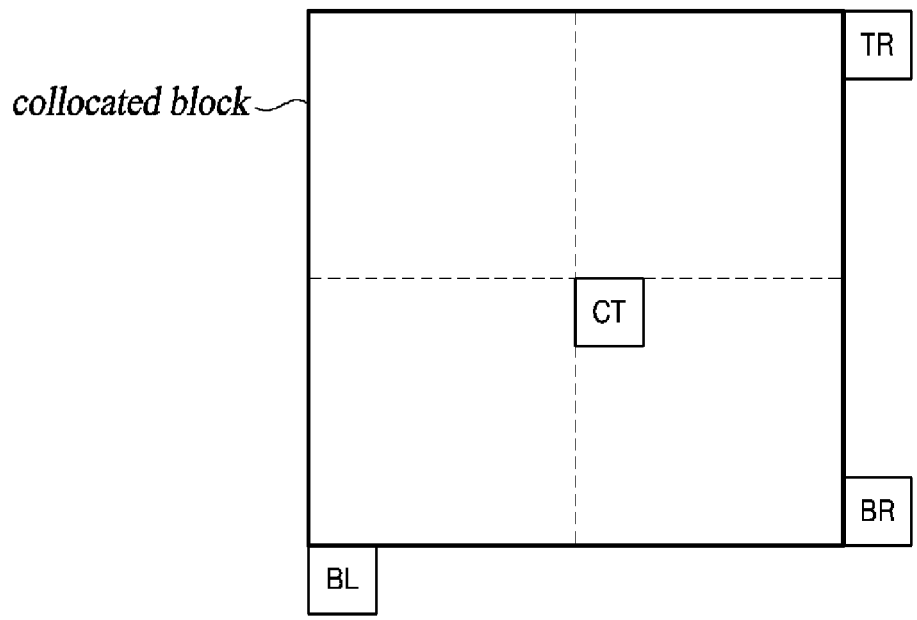

As shown in FIG. 17, the temporal neighbor block may mean one or more blocks adjacent to a collocated block (col_block) located in a collocated picture (col_picture). Here, the col_picture may be pre-specified, for example, as a picture positioned at the first position (with an index of 0) of a reference picture list (L0 or L1). The col_block may be pre-specified, for example, as is positioned in the col_picture, but may be pre-specified for example, as a block located at a position in the col_picture that is the same as the the position of the current block in the current picture.

As shown in FIG. 17, the temporal neighbor blocks may include block BR positioned at the lowermost right side of the col_block, block CT positioned at the center of the col_block, block TR positioned at the upper right side of the col_block, and block BL positioned at the bottom left side of the col_block.

When the positions of temporal neighbor blocks are represented based on pixels, BR may be a block including a pixel positioned at the bottom right of the current block as a bottommost pixel thereof, and CT may be a block including the pixel positioned at the center of the current block as a top leftmost pixel thereof. TR may be a block including the pixel positioned at the top right of the current block as a top leftmost pixel thereof, and BL may be a block including a pixel positioned at the bottom left of the current block as a top leftmost pixel thereof.

The video decoding device may derive one or more BVP candidates by searching for temporal neighbor blocks according to a preset order, and configure a BVP candidate list including the derived BVP candidates.

The preset BV may correspond to a BV indicating a position shifted to the upper left by the height and width of the current block. For example, when the width of the current block is W and the height of the current block is H, the preset BV may be (−W, −H). Also, the preset BV may be (−W*k, −H*k), which is obtained by changing the size of the BV using a certain constant k. The preset BV may be referred to as a default BV as it is not acquired through a search operation but is preset.

Figure 18:
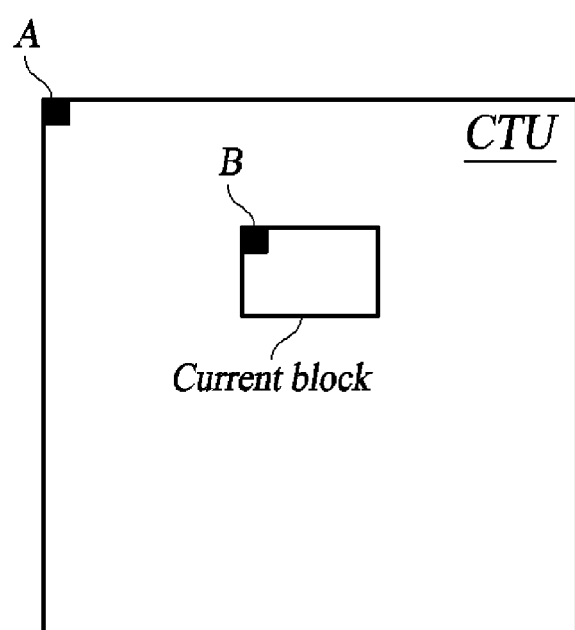

The BVs described in Embodiment 2-1 may represent relative positions with respect to a CTU containing the current block or may represent relative positions with respect to the current block. As shown in FIG. 18, from the perspective of the top leftmost pixel (B) of the current block, the BVs described in Embodiment 2-1 may be vectors indicating relative positions with respect to pixel B by setting position of pixel B as a zero vector. From the perspective of the top leftmost pixel (A) of the CTU containing the current block, the BVs described in Embodiment 2-1 may be vectors indicating relative positions with respect to pixel A by setting position of pixel A as a zero vector.

The video decoding device may (selectively) represent the BVs based on one of the current block and the CTU containing the current block. When the BVs are represented based on the current block or the CTU containing the current block (when references for representing the BVs are selectively applied), the search range for searching for BVP candidates may be efficiently set. Accordingly, the present disclosure may effectively reduce the amount of memory consumed in searching for BVP candidates, and reduce the number of bits consumed in representing the BVs.

Embodiment 2-2

In Embodiment 2-2, a history-based BV that may replace the BV of a temporal neighbor block is proposed. A BVP candidate list configured through Embodiment 2-2 may include the BV of a block which is (or has been) predicted in the ibc mode. That is, the BVP candidate list according to Embodiment 2-2 may include BVs of blocks predicted in the ibc mode among the blocks that have already been decoded (predicted) before decoding of the current block.

In order to use the BVs of the blocks that have been predicted in the ibc mode for prediction of the current block, a component for storing the BVs of the blocks that have been predicted in the ibc mode is required. In the present disclosure, this "component for storing" is referred to as "a record" or a history-based BV (HBV) for the ibc mode. In addition, the BVs stored in the HBV (i.e., the BVs of the blocks that have been predicted in the ibc mode) may constitute a list. This list may be referred to as a history-based block vector predictor (HBVP) candidate list.

The HBV may have a first-in first-out (FIFO) structure capable of storing one or more BVs. When a separate BVP candidate list is configured per independent processing unit, such as tile group, for parallel processing, the first BV stored in the HBV may correspond to a zero vector.

When the BVs of blocks that have been predicted in the ibc mode are sequentially (FIFO) stored in the HBV according to a prediction order (decoding order), and then a certain block (current block) is to be predicted in the ibc mode, the BVs may be sequentially searched for (in reverse to the order of storage or in reverse to the order of decoding) starting with the BV stored last in the HBV, and one or more BVs may be selected. Then, the selected BVs may be included in the BVP candidate list.

The BVs selected in the HBV may replace the "temporal BV" and/or the "preset BY" among the BVs included in the BVP candidate list. That is, the processes for configuring the BVP candidate list implemented in Embodiment 2-2 may be implemented in various orders, such as "configuring spatial BVs→configuring BVs selected from the HBV," "configuring spatial BVs"→configuring BVs selected from the HBV→configuring a preset BV," and "configuring spatial BVs→configuring temporal BVs→configuring BVs selected from the HBV".

Here, the "temporal BVs" represent BVs of neighbor blocks predicted in the ibc mode among the temporal neighbor blocks, and the "spatial BVs" represent BVs of neighbor blocks predicted in the ibc mode among the spatial neighbor blocks. Accordingly, the video decoding device may select an appropriate number of BVs from the HBV according to the type of a BV to be replaced (temporal BV and/or preset BV). In addition, the "configuring of BVs selected from the HBV" may be performed when the number of BVP candidates included in the BVP candidate list through the previous BV configuration process(es) is less than the maximum number of candidates that may be included in the BVP candidate list.

Embodiment 2-3

In Embodiment 2-3, a zero BV that may replace a preset BV is proposed.

The processes for configuring the BVP candidate list implemented in Embodiment 2-3 may be implemented in various orders, such as "configuring spatial BVs→configuring temporal BVs→configuring a zero BY" and "configuring spatial BVs→configuring BVs selected from the HBV→configuring a zero BV."

The "zero BV configuration" may be performed when the number of BVP candidates included in the BVP candidate list is less than the maximum number of candidates that may be included in the BVP candidate list through the previous BV configuration process(es).

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the present invention is not limited by the embodiments explicitly described above but is inclusive of the claims and equivalents thereto.

The invention claimed is:

1. A method of predicting a block to be decoded in an intra block copy (ibc) mode, the method comprising:
   determining that a current block is decoded in an ibc mode;
   decoding, from a bitstream, motion information which includes a block vector predictor (BVP) index and a block vector difference (BVD) for the current block;
   constructing a BVP candidate list for the current block;
   from the BVP candidate list, selecting a BVP candidate corresponding to the BVP index;
   deriving a block vector (BV) of the current block based on the BVD and the selected BVP candidate; and
   predicting the current block using a reference block, within the current picture, indicated by the derived BV,
   wherein the BVP candidate list is constructed by adding k BVP candidates to the BVP candidate list in following order until the BVP candidate list is full, wherein k is a preset integer greater than 0:
   1) a block vector of a left neighboring block positioned on a left side of the current block, the left neighboring block predicted in the ibc mode;
   2) a block vector of an upper neighboring block positioned above the current block, the upper neighboring block predicted in the ibc mode;
   3) one or more block vectors from a history based motion vector predictor (HMVP) candidate list, wherein the HMVP candidate list contains a respective block vector of at least one block already predicted in the ibc mode; and
   4) one or more zero block vectors.

2. The method of claim 1,
   wherein the left neighboring block comprises a block positioned at a lower side along a height of the current block, and
   wherein the upper neighboring block comprises a block positioned on a right side along a width of the current block.

3. The method of claim 1, wherein the HMVP candidates are listed in the HMVP candidate list in the order in which related blocks are predicted in the ibc mode, and the HMVP candidates are used to compose the BVP candidate list in the reverse order to the order listed in the HMVP candidate list.

4. A method of predicting a block to be encoded in an intra block copy (ibc) mode, the method comprising:
   determining that a current block is encoded in an ibc mode;
   determining a block vector (BV) for the current block;
   predicting the current block using a reference block, within the current picture, indicated by the BV,
   constructing a block vector predictor (BVP) candidate list for the current block;
   selecting a BVP candidate, from the BVP candidate list, to determine a BVP index;

deriving the block vector difference (BVD) for the current block based on the BV and the selected BVP candidate; and encoding motion information which includes the BVP index and the BVD for the current block, wherein the BVP candidate list is constructed by adding k BVP candidates to the BVP candidate list in following order until the BVP candidate list is full, wherein k is a preset integer greater than 0:
1) a block vector of a left neighboring block positioned on a left side of the current block, the left neighboring block predicted in the ibc mode;
2) a block vector of an upper neighboring block positioned above the current block, the upper neighboring block predicted in the ibc mode;
3) one or more block vectors from a history based motion vector predictor (HMVP) candidate list, wherein the HMVP candidate list contains a respective block vector of at least one block already predicted in the ibc mode; and
4) one or more zero block vectors.

5. The method of claim 4, wherein the left neighboring block comprises a block positioned at a lower side along a height of the current block, and wherein the upper neighboring block comprises a block positioned on a right side along a width of the current block.

6. The method of claim 4, wherein the HMVP candidates are listed in the HMVP candidate list in the order in which related blocks are predicted in the ibc mode, and the HMVP candidates are used to compose the BVP candidate list in the reverse order to the order listed in the HMVP candidate list.

7. A non-transitory computer readable medium storing a bitstream containing an encoded video data, the encoded video data being decoded from the bitstream by processes of:

determining that a current block is decoded in an intra block copy (ibc) mode;

decoding, from a bitstream, motion information which includes a block vector predictor (B VP) index and a block vector difference (BVD) for the current block;

constructing a BVP candidate list for the current block;

from the BVP candidate list, selecting a BVP candidate corresponding to the BVP index;

deriving a block vector (BV) of the current block based on the BVD and the selected BVP candidate; and predicting the current block using a reference block, within the current picture, indicated by the derived BV, wherein the BVP candidate list is constructed by adding k BVP candidates to the BVP candidate list in following order until the BVP candidate list is full, wherein k is a preset integer greater than 0:
1) a block vector of a left neighboring block positioned on a left side of the current block, the left neighboring block predicted in the ibc mode;
2) a block vector of an upper neighboring block positioned above the current block, the upper neighboring block predicted in the ibc mode;
3) one or more block vectors from a history based motion vector predictor (HMVP) candidate list, wherein the HMVP candidate list contains a respective block vector of at least one block already predicted in the ibc mode; and
4) one or more zero block vectors.

8. The non-transitory computer readable medium of claim 7, wherein the left neighboring block comprises a block positioned at a lower side along a height of the current block, and wherein the upper neighboring block comprises a block positioned on a right side along a width of the current block.

9. The non-transitory computer readable medium of claim 7, wherein the HMVP candidates are listed in the HMVP candidate list in the order in which related blocks are predicted in the ibc mode, and the HMVP candidates are used to compose the BVP candidate list in the reverse order to the order listed in the HMVP candidate list.

* * * * *